United States Patent
Hashikura et al.

(10) Patent No.: US 8,710,377 B2
(45) Date of Patent: Apr. 29, 2014

(54) ELECTRIC CONNECTION BOX

(75) Inventors: Manabu Hashikura, Yokkaichi (JP); Tatsuya Shimizu, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 554 days.

(21) Appl. No.: 12/451,670

(22) PCT Filed: Jul. 4, 2008

(86) PCT No.: PCT/JP2008/062160
§ 371 (c)(1),
(2), (4) Date: Nov. 24, 2009

(87) PCT Pub. No.: WO2009/008366
PCT Pub. Date: Jan. 15, 2009

(65) Prior Publication Data
US 2010/0163302 A1    Jul. 1, 2010

(30) Foreign Application Priority Data

Jul. 9, 2007    (JP) ................. 2007-180048

(51) Int. Cl.
| | | |
|---|---|---|
| *H01R 13/46* | (2006.01) | |
| *H01H 9/02* | (2006.01) | |
| *H01H 13/04* | (2006.01) | |
| *H01H 19/04* | (2006.01) | |
| *H01H 21/04* | (2006.01) | |
| *H02B 1/26* | (2006.01) | |
| *H02B 1/04* | (2006.01) | |
| *H05K 7/20* | (2006.01) | |
| *H01R 12/00* | (2006.01) | |
| *H05K 1/00* | (2006.01) | |

(52) U.S. Cl.
USPC ............. 174/520; 174/56; 361/626; 361/631; 439/76.1

(58) Field of Classification Search
CPC ............ H01R 9/09; H01R 9/24; H01R 9/265; H01R 12/00; H01R 13/46; H01H 9/02; H01H 13/04; H01H 19/04; H01H 21/04; H02G 3/08; H02G 3/081; H02G 3/083; H02G 3/085; H02G 3/086; H02G 3/18; H02B 1/04; H02B 1/26; H05K 1/00; H05K 7/20

USPC ......... 174/17 R, 56, 520, 526, 533, 547, 559; 361/626, 630, 631, 632, 634, 690, 692; 439/76.1, 76.2, 74, 949

See application file for complete search history.

(56) References Cited

U.S. PATENT DOCUMENTS 5,310,351 A * 5/1994 McAdow et al. ............... 439/74

(Continued)

FOREIGN PATENT DOCUMENTS

JP    A 63-17515    2/1988

(Continued)

OTHER PUBLICATIONS

Search Report issued for International Application No. PCT/FR2008/062160 on Sep. 30, 2008.

(Continued)

*Primary Examiner* — Chau N Nguyen
*Assistant Examiner* — Roshn Varghese
(74) *Attorney, Agent, or Firm* — Oliff PLC

(57) ABSTRACT

An electric connection box has a circuit board, a conductive member (a first bus bar, a second bus bar, a first connection fitting, a second connection fitting, or a lead terminal) connected to the circuit board and extending in the direction away from the circuit board, a relay provided at the end of the conductive member which is located on the opposite side of the circuit board, and a case for receiving the circuit board and having an opening provided at a position corresponding to the relay. The relay is exposed at the opening to the outside of the case.

10 Claims, 27 Drawing Sheets

(56) References Cited

U.S. PATENT DOCUMENTS

| | | | |
|---|---|---|---|
| 5,764,487 A * | 6/1998 | Natsume | 361/775 |
| 6,494,723 B2 * | 12/2002 | Yamane et al. | 439/76.2 |
| 6,506,060 B2 * | 1/2003 | Sumida et al. | 439/76.2 |
| 6,677,521 B2 * | 1/2004 | Sumida et al. | 174/50 |
| 6,808,397 B2 | 10/2004 | Kondo | |
| 2005/0135065 A1 * | 6/2005 | Nakatsu et al. | 361/703 |
| 2008/0119066 A1 * | 5/2008 | Shimizu et al. | 439/76.1 |
| 2008/0119068 A1 * | 5/2008 | Shimizu et al. | 439/76.2 |
| 2008/0130224 A1 * | 6/2008 | Hashikura et al. | 361/690 |

FOREIGN PATENT DOCUMENTS

| | | |
|---|---|---|
| JP | A 6-52771 | 2/1994 |
| JP | A 8-84422 | 3/1996 |
| JP | A 2002-305048 | 10/2002 |
| JP | A 2004-120838 | 4/2004 |
| JP | A 2004-135396 | 4/2004 |

OTHER PUBLICATIONS

Japanese Office Action issued Feb. 14, 2012 in Japanese Patent Application No. 2007-180048 (with translation).

* cited by examiner

ELECTRIC CONNECTION BOX

TECHNICAL FIELD

The present invention relates to an electric connection box.

BACKGROUND ART

Patent Literature 1 has been well-known as a conventional electric connection box. This electric connection box is constituted by housing an electric circuit, which is constituted by, for example, holding a wire on an insulating plate, inside of a case. Provided on the outer surface of the case is a housing member for housing such as a relay. A terminal connected with the electric circuit is positioned inside of this housing member. This terminal is constituted so as to be connected with such as a relay housed inside of the housing member.

These days, downsizing of electric connection boxes has been demanded. As in the above configuration, when forming the housing member for providing a relay on the outer surface of the case, the housing member is needed to house the relay, and therefore be formed larger than the outer dimension of the relay. Thus, it has been difficult to downsize an electric connection box.

Considering the foregoing, the relay may be connected to the circuit board by such as, for example, soldering. This may omit the housing member provided in the case, and thereby downsizing an electric connection box.

However, when the relay is provided on the circuit board, almost no clearance is formed between the relay and the circuit board, and thus, the heat generated from the relay may remain between the relay and the circuit board. Then, it is concerned that a crack caused by expansion and suppression of the circuit board may occur in the soldered part between the relay and the circuit board, and the connection reliability of the soldered part may be degraded.

[Patent Literature 1]: Japanese Unexamined Patent Application Publication No. H08-84422

The present invention has been made on the basis of the above circumstances, with an object of providing an electric connection box with improved connection reliability between a switching member and a circuit board.

SUMMARY

The present invention relates to an electric connection box, comprising a circuit board, a conductive member which is connected with the circuit board and is extending in the direction away from the circuit board, a switching member provided at the end of the conductive member which is located on the opposite side of the circuit board, and a case for housing the circuit board and having an opening in the position corresponding to the switching member, wherein the switching member is exposed at the opening to the outside of the case.

The above-mentioned conductive member forms a clearance between the circuit board and the switching member, so that remaining of the heat generated from the switching member can be suppressed. Furthermore, the switching member is exposed to the outside of the case, so that the heat generated from the switching member can be efficiently released to the outside of the case. This can suppress the temperature rise of the circuit board caused by the heat generated from the switching member, so as the expansion and contraction of the circuit board caused by the temperature change. As a result, the connection reliability between the conductive member and the circuit board can be improved, and thereby the connection reliability between the switching member and the circuit board can be improved.

According to the present invention, the connection reliability between the switching member and the circuit board can be improved by improving the heat radiation performance of the switching member.

DESCRIPTION OF SYMBOLS

Figure 1:
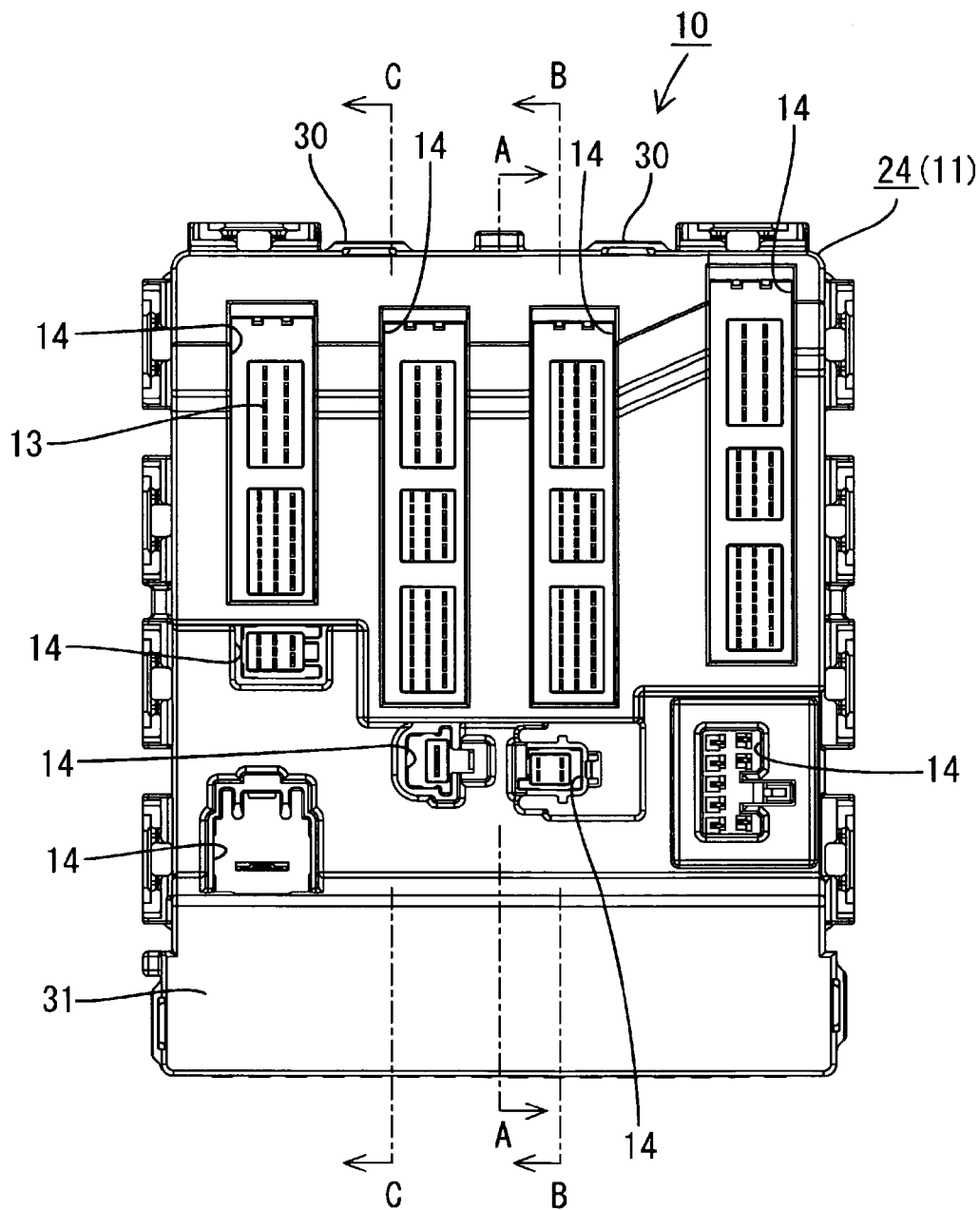
FIG. 1 is an elevation view showing an electric connection box according to Embodiment 1.

10 . . . electric connection box
12 . . . circuit board

15 ... first bus bar (conductive member, connection fitting)
16 ... second bus bar (conductive member, connection fitting)
24 ... case body (case)
25 ... cover (case)
34 ... relay
42 ... first connection fitting (conductive member, connection fitting)
43 ... second connection fitting (conductive member, connection fitting)
49 ... lead terminal (conductive member)
50 ... lead protruding surface
56 ... opening
57 ... upper wall opening (opening)

BEST MODE FOR CARRYING OUT THE INVENTION

<Embodiment 1>

In reference to FIGS. 1 to 12, Embodiment 1 of the present invention is described. An electric connection box 10 in the present embodiment is mounted in a vehicle not shown for its use. The electric connection box 10 is assembled between a battery (not shown) and vehicle electrical components such as a lamp and power window (not shown), and controls the connection and disconnection of these vehicle electrical components. The electric connection box 10 is assembled inside of, for example, a vehicle cabin in an upright posture as shown in FIG. 1. The electric connection box 10 is constituted by housing a circuit board 12 inside of a flat case 11.

Figure 6:
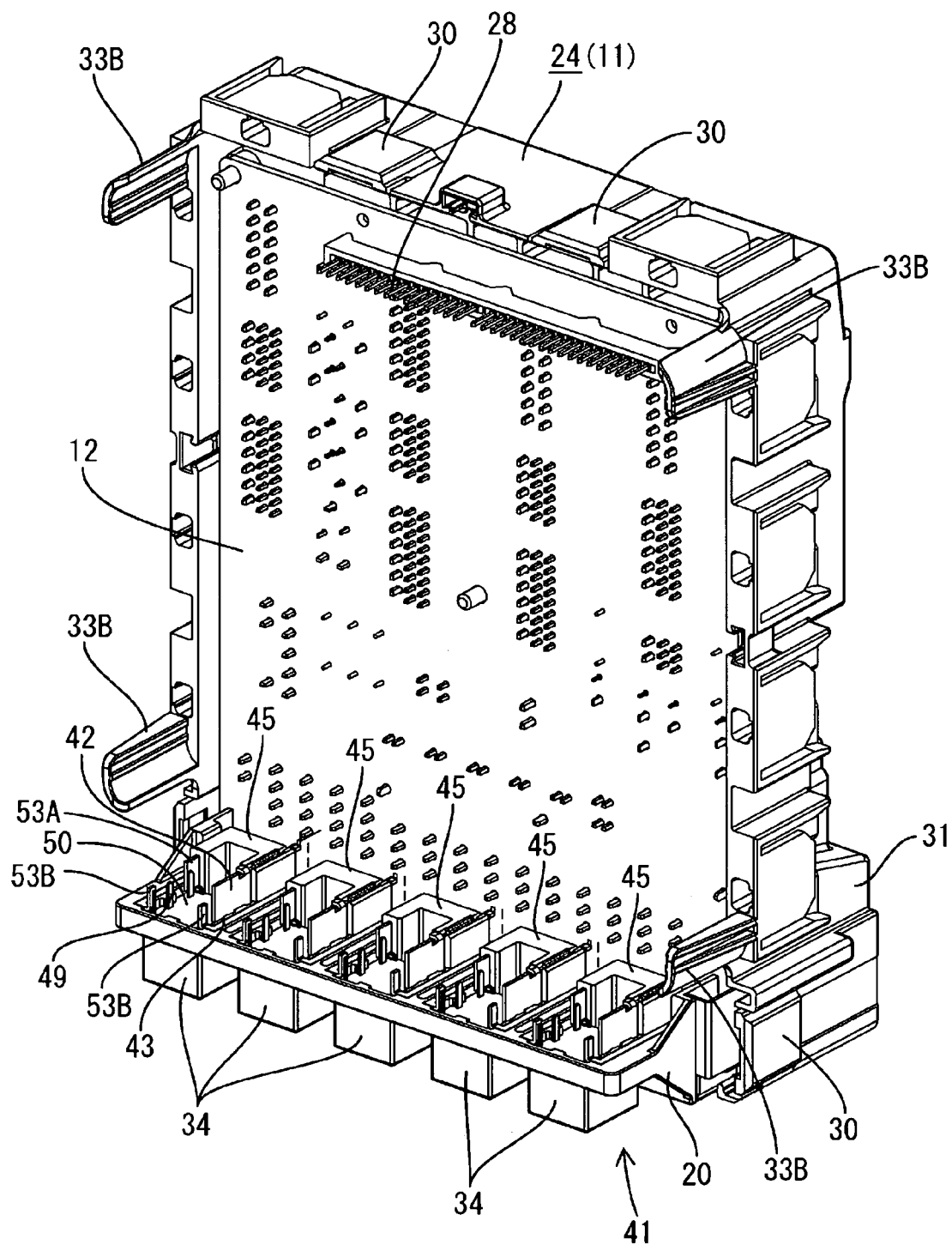
FIG. 6 is a perspective view showing a state of the electric connection box with its cover removed.

As shown in FIG. 6, the circuit board 12 forms a nearly rectangular shape, and a conductive path (not shown) is formed on its surface by means of the printed wiring technology. A male tab 13 as a connector for connecting with an external circuit is connected with the circuit board 12 (see FIG. 2). The male tab 13 is positioned inside of the later-described connector housing member 14 (see FIG. 1).

Figure 10:
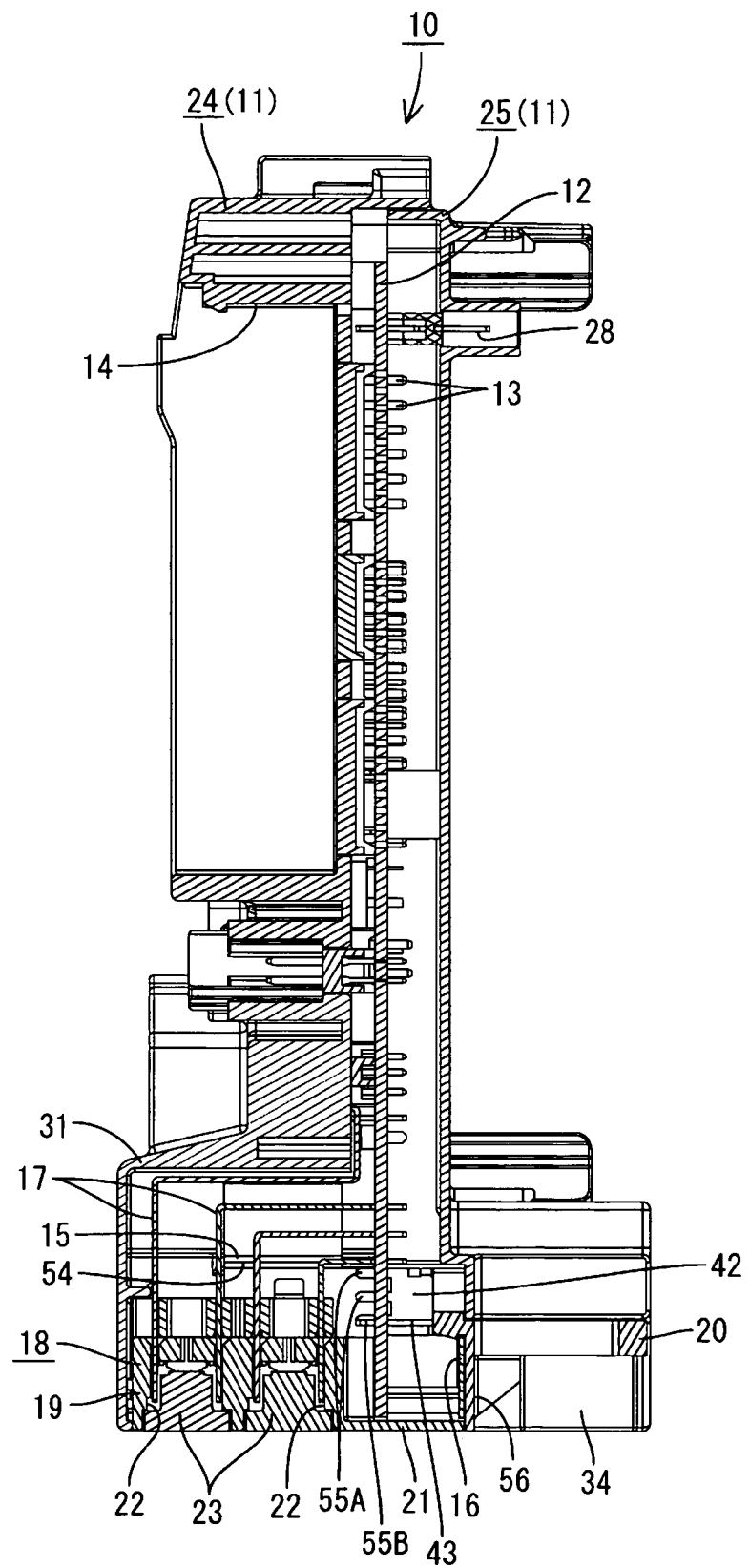
FIG. 10 is a cross-sectional view taken along a line B-B in FIG. 1, showing the electric connection box before an ECU is fitted therein.
Figure 11:
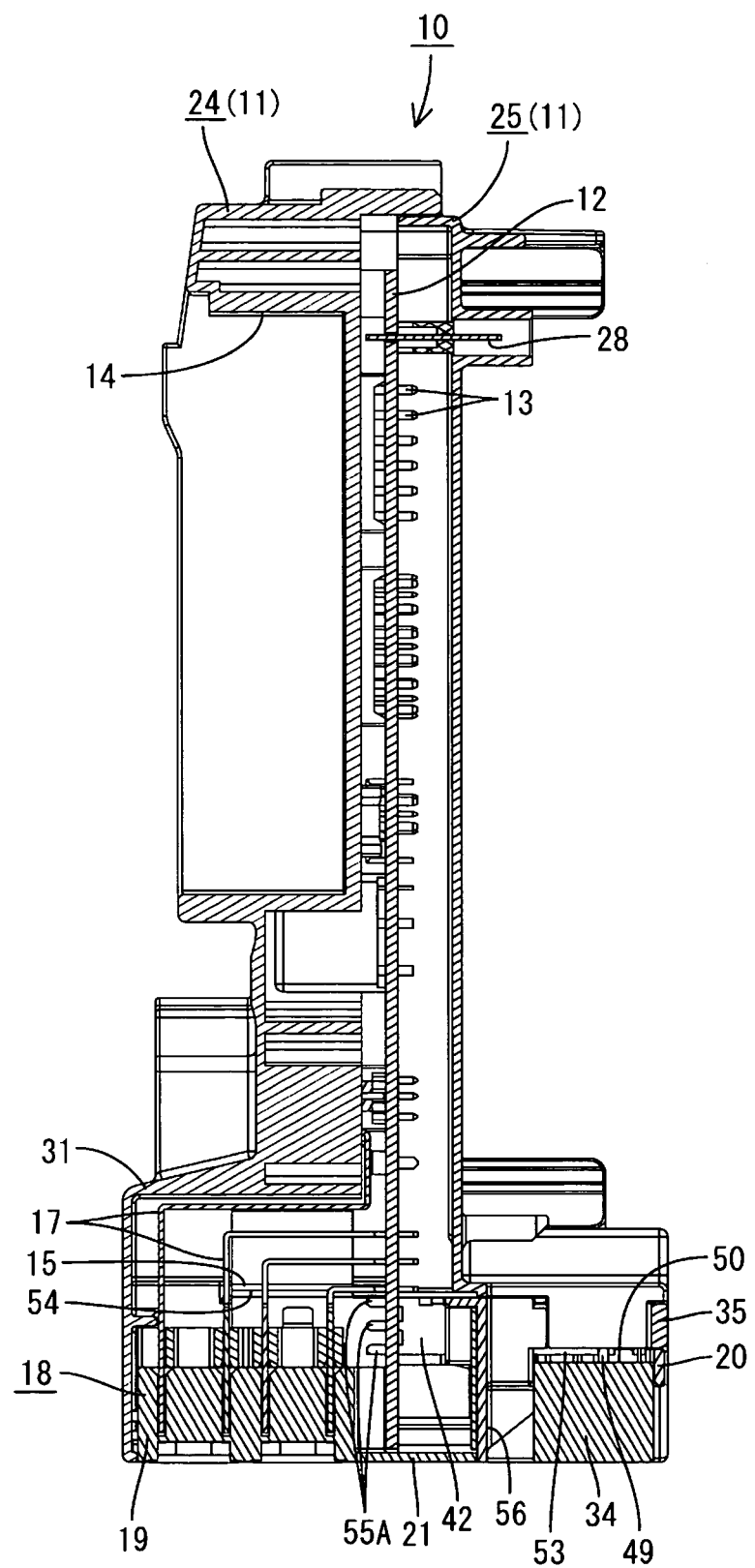
FIG. 11 is a cross-sectional view taken along a line C-C in FIG. 1, showing the electric connection box before an ECU is fitted therein.

In addition, as shown in FIGS. 10 and 11, a first bus bar 15 (an example of a conductive member, a connection fitting) is connected with the circuit board 12 by well-known means such as, for example, soft-soldering. The first bus bar 15 is connected with the later-described second bus bar 16 (an example of a conductive member, a connection fitting).

Figure 4:
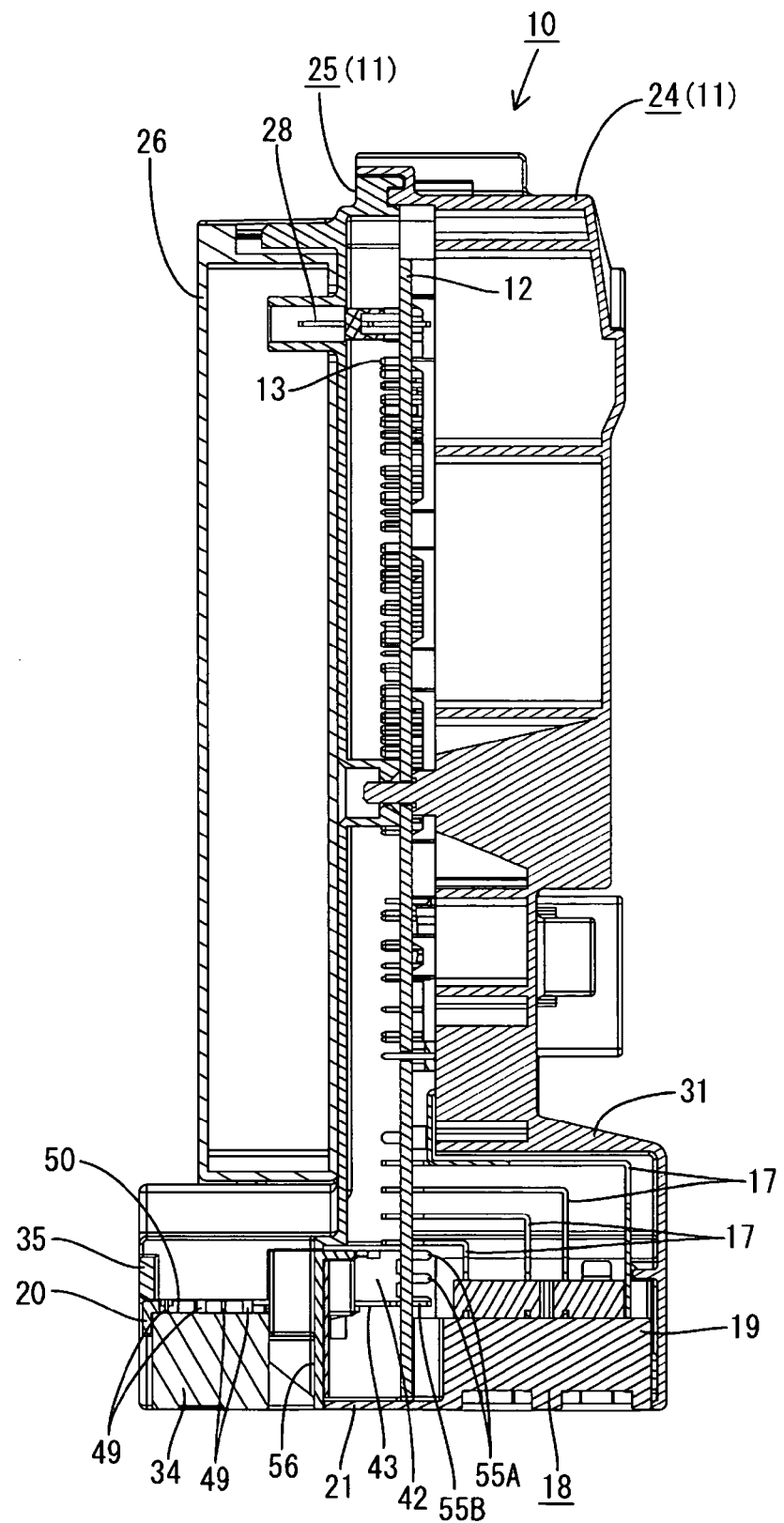
FIG. 4 is a cross-sectional view taken along a line A-A in FIG. 1.

As shown in FIG. 4, at the position close to the lower end of the circuit board 12, one ends of a plurality of fuse terminals 17 penetrate the circuit board 12 from the right to the left direction in FIG. 4. One ends of the fuse terminals 17 are soldered to the circuit board 12. The other ends of the fuse terminals 17 are bent downwardly into a nearly L shape and attached to the later-described fuse block 18.

Figure 3:
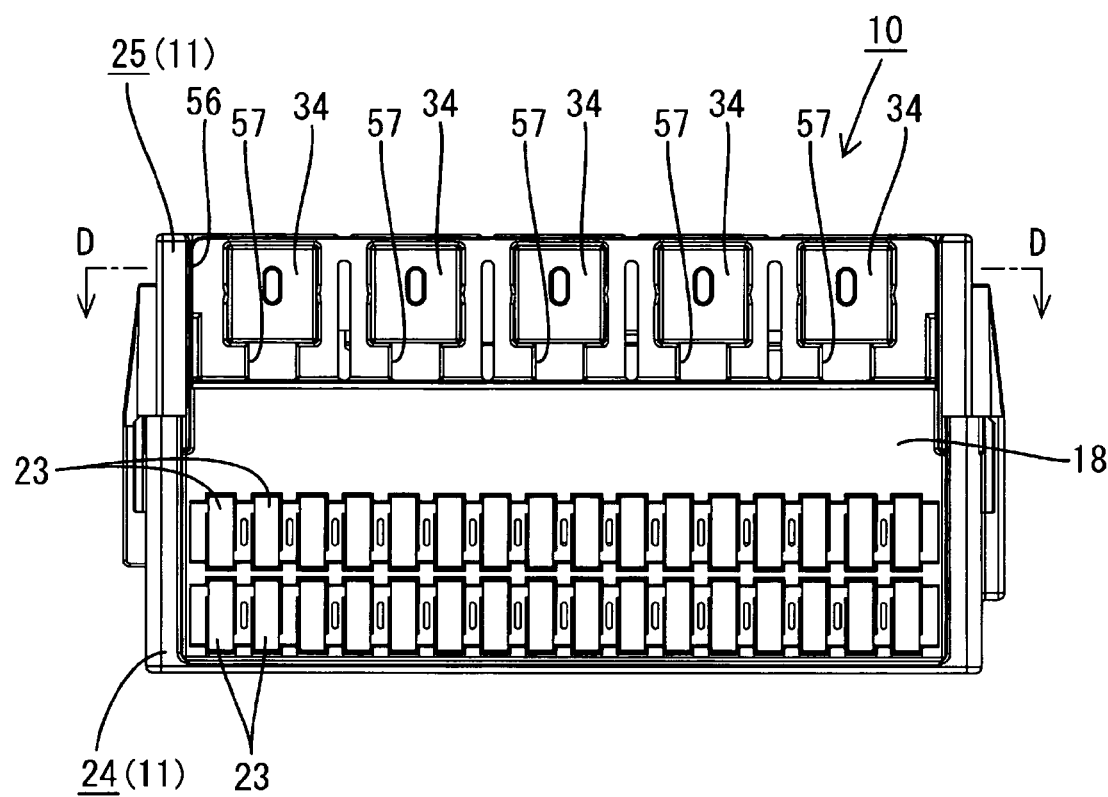
FIG. 3 is a bottom view of the electric connection box.
Figure 7:
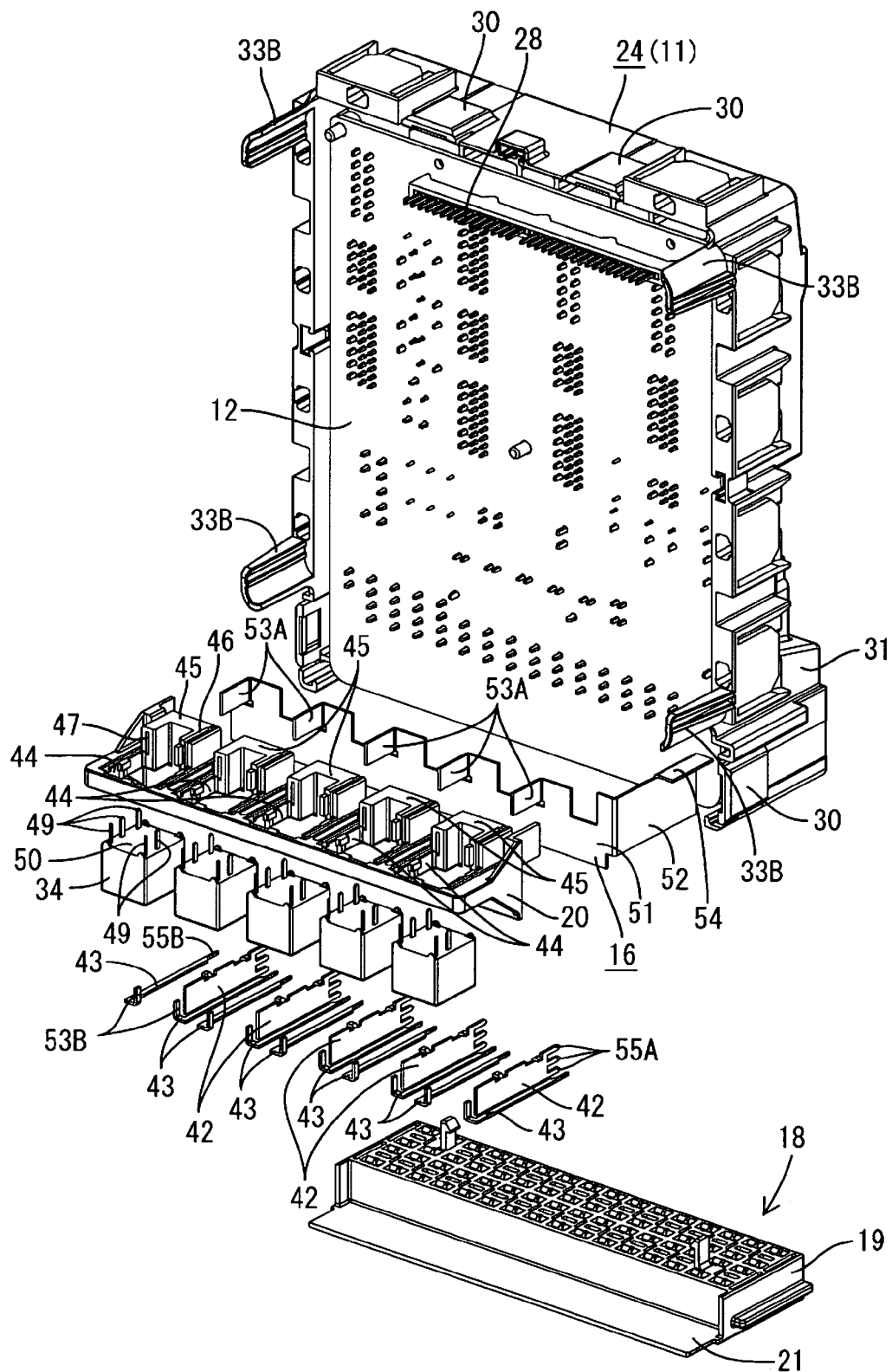
FIG. 7 is an exploded perspective view of the electric connection box in FIG. 6.
Figure 8:
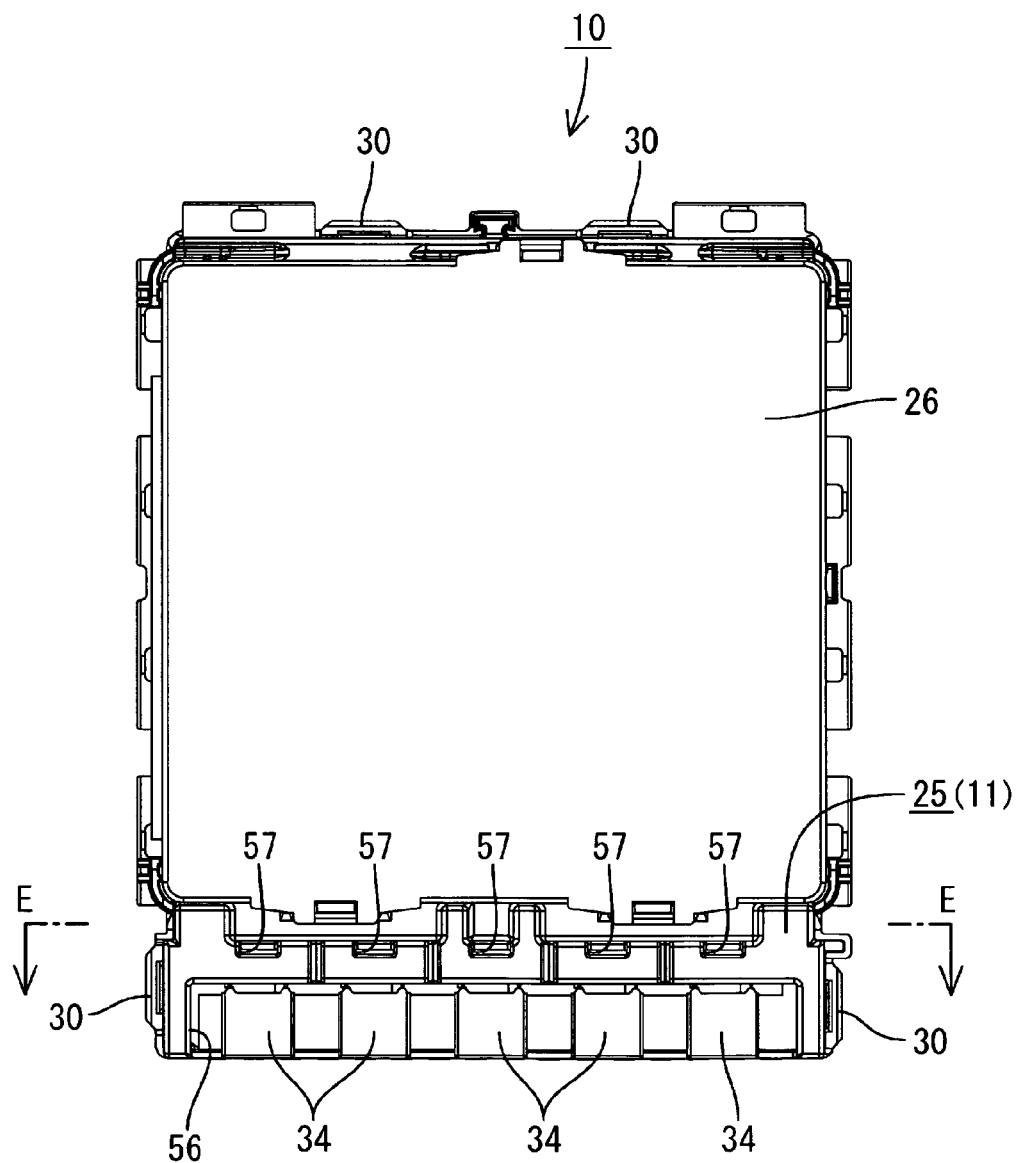
FIG. 8 is a back view of the electric connection box.

As shown in FIGS. 4 and 7, the fuse block 18 is made of synthetic resin, and comprising a fuse block body 19 formed into a nearly right-angled parallelepiped shape and a supporting member 21 extending in the left direction in FIG. 4 from the body and supporting the later-described frame 20. A fuse attaching member 22 recessed upwardly is formed on the bottom surface of the fuse block body 19 in FIG. 4. The fuse terminal 17 is positioned inside of this fuse attaching member 22. A fuse 23 is attached inside of the fuse attaching member 22, so as to be capable of connecting with the fuse terminal 17 (see FIG. 10). As shown in FIG. 3, the fuse attaching members 22 are aligned in the right and left direction in FIG. 3, while being aligned up and down in FIG. 3 (in the present embodiment, in two stages).

Figure 5:
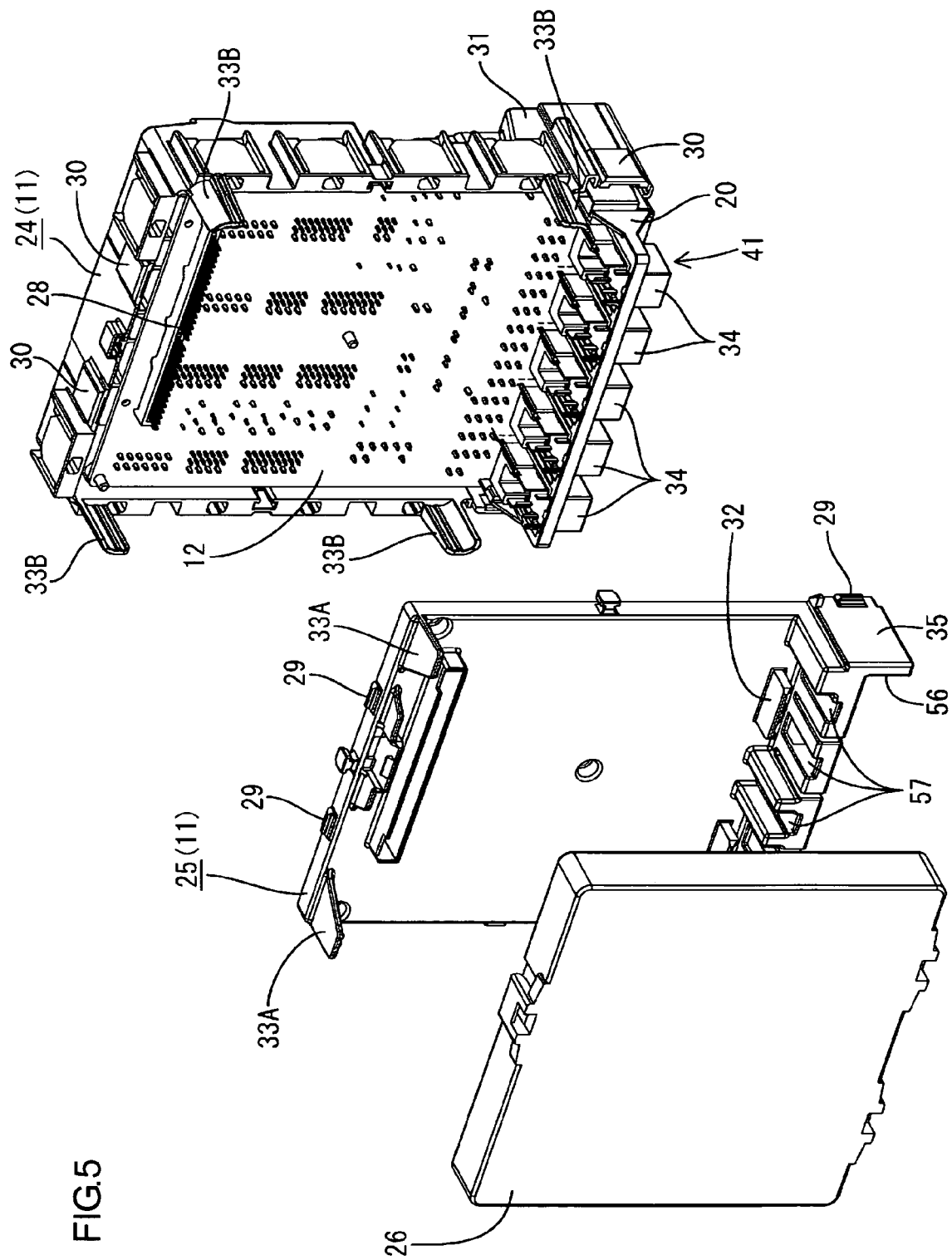
FIG. 5 is an exploded perspective view of the electric connection box.

As shown in FIG. 5, the case 11 forms a shape of shallow container made of synthetic resin, and comprises a flat case body 24 for housing the circuit board 12 therein and a cover 25 covering the opening surface of the case body 24. An ECU 26 is attached to the cover 25 on a surface located on the opposite side of the case body 24.

The ECU 26 is constituted by housing an ECU substrate not shown. The ECU substrate and the circuit board 12 are connected via an ECU connecting terminal 28 provided in a manner so as to penetrate the ECU 26 and the cover 25. The ECU connecting terminal 28 is connected with the circuit board 12 at a position closer to the upper end of the circuit board 12 in FIG. 4.

Figure 2:
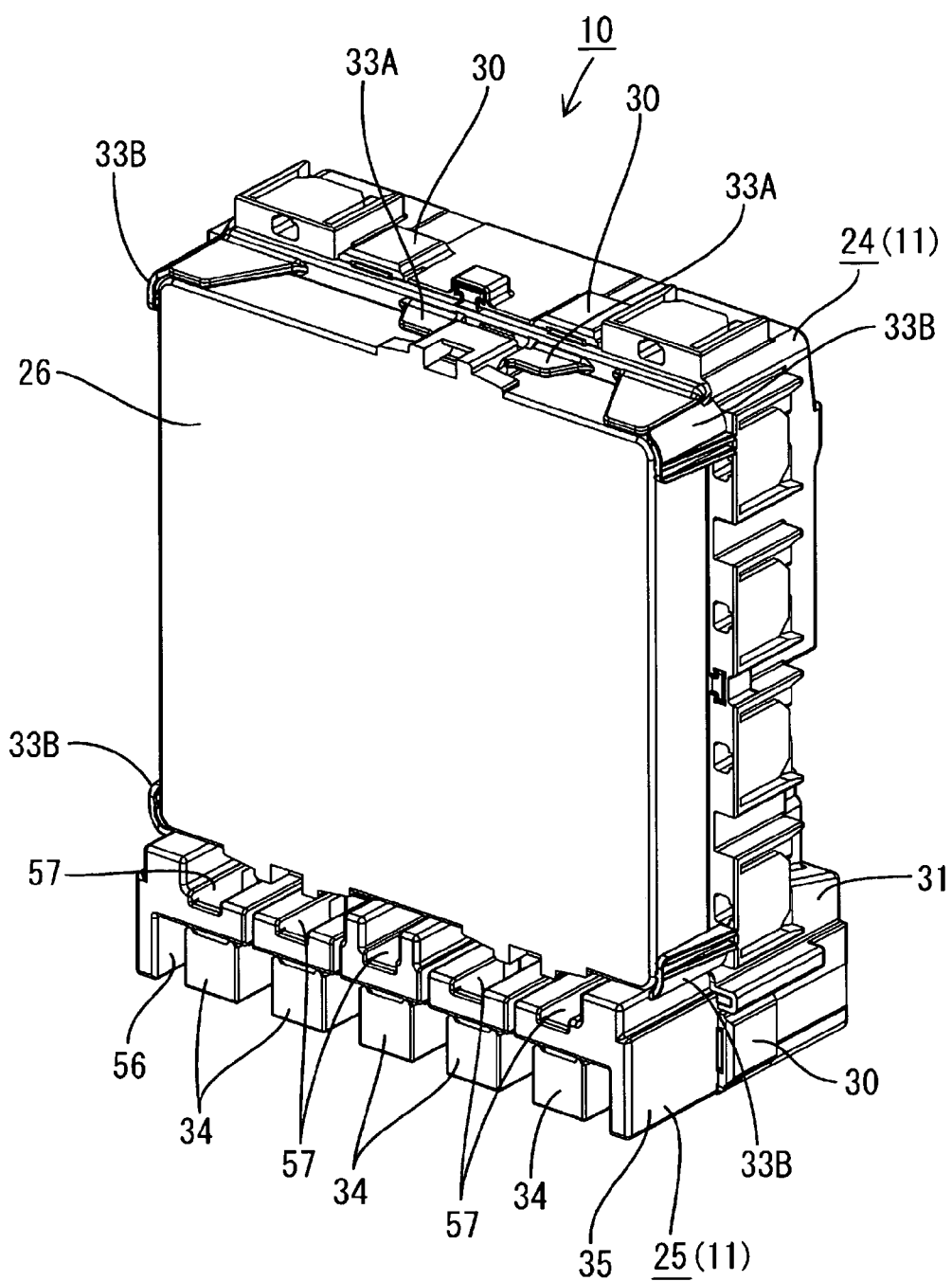
FIG. 2 is a perspective view of the electric connection box.

Provided on the upper and side faces of the case body 24 in FIG. 2 are a plurality of lock receivers 30 to be elastically fitted with a plurality of lock protrusions 29 provided on the upper and side faces of the cover 25, and fitting these lock receivers 30 with the lock protrusions 29 allows the case body 24 and the cover 25 to be integrated.

The lower end of the case body 24 is bulging to the right direction in FIG. 4, forming a fuse housing member 31 for housing the above-mentioned fuse block body 19. The lower end of the fuse housing member 31 is opening downwardly, and the fuse block 18 is attached in this opening. As shown in FIG. 4, the lower opening edge of the fuse housing member 31 and the outer surface of the bottom of the fuse block 18 are nearly flush with each other.

A plurality of connector housing members 14 for attaching connectors are provided on the wall surface of the case body 24 in the front side of the page of FIG. 1, by being recessed in the depth direction of the page. The male tab 13 is positioned inside of the connector housing member 14.

The cover 25 is, as shown in FIGS. 4 and 5, forming nearly a shallow plate shape and attached to the case body 24 so as to cover its opening surface. As shown in FIG. 5, the lock protrusion 29 to be engaged with the lock receiver 30 in the case body 24 is formed on the upper and side wall of the cover 25. In addition, a lock 32 protruding to the side of the ECU 26 and capable of elastic flexure is formed on the wall surface of the cover 25 that is opposed to the ECU 26 and elastically engages with a receiving portion (not shown) formed in the ECU 26, and thereby integrating the cover 25 and the ECU 26.

Then, as shown in FIG. 5, a plate-like guide 33A protruding to the side of the ECU is formed on the wall surface of the cover 25 that is opposed to the ECU 26. When fitting the cover 25 and the ECU 26, abrading contact between the guide 33A and the outer side surface of the ECU 26 allows the ECU 26 to be guided to the prescribed fitting position. Moreover, four guides 33B extending toward the cover 25 are provided in the four corners on the opening surface of the case body 24. When fitting the case body 24 with the cover 25 and the ECU 26, the outer surfaces in the cover 25 and the ECU 26 in positions corresponding to the guide 33B are in an abrading contact with the inner side surface of the guide 33B, so that the cover 25 and the ECU 26 are guided to the prescribed fitting positions (see FIG. 2). Additionally, the ECU 26 may be fitted after the case body 24 and the cover 25 are fitted.

As shown in FIG. 4, the lower end of the cover 25 is bulging to the left direction in FIG. 4, forming a relay housing member 35 for housing the later described relay 34 (an example of a switching member).

As shown in FIG. 6, a relay unit 41 including the relay 34 is attached to the lower end of the circuit board 12. The relay unit 41 is constituted by fitting in a frame 20 made of synthetic resin: a metallic second bus bar 16 (an example of a conductive member), the relays 34 (five in the present embodiment), first connection fittings 42 (an example of a conductive member, five in the present invention), and second connection fittings 43 (an example of a conductive member, ten in the present embodiment).

As shown in FIG. 7, relay fitting members 44 (five in the present embodiment) for fitting the relay 34 are formed in the frame 20, aligning from the right front side to the obliquely left rear side in FIG. 7, while penetrating up and down. In the obliquely right rear side of each relay fitting member 44 in FIG. 7, the second bus bar 16, the first connection fitting 42, and a mounting member 45 (five in the present embodiment) for fitting the second connection fitting 43 are provided in a manner so as to project upwardly in FIG. 7.

In each mounting member 45, formed on the wall in the left rear side in FIG. 7 is a bus bar housing groove 46 for housing a relay connecting part 53A in the later-described second bus bar 16, formed in a manner of extending from the right rear side to the left front side. Additionally, in each mounting member 45, on the wall in the right front side in FIG. 7, a fitting housing hole 47 (five in the present embodiment) for housing the first connection fitting 42 is bored from the left front side toward the right rear side.

Figure 9:
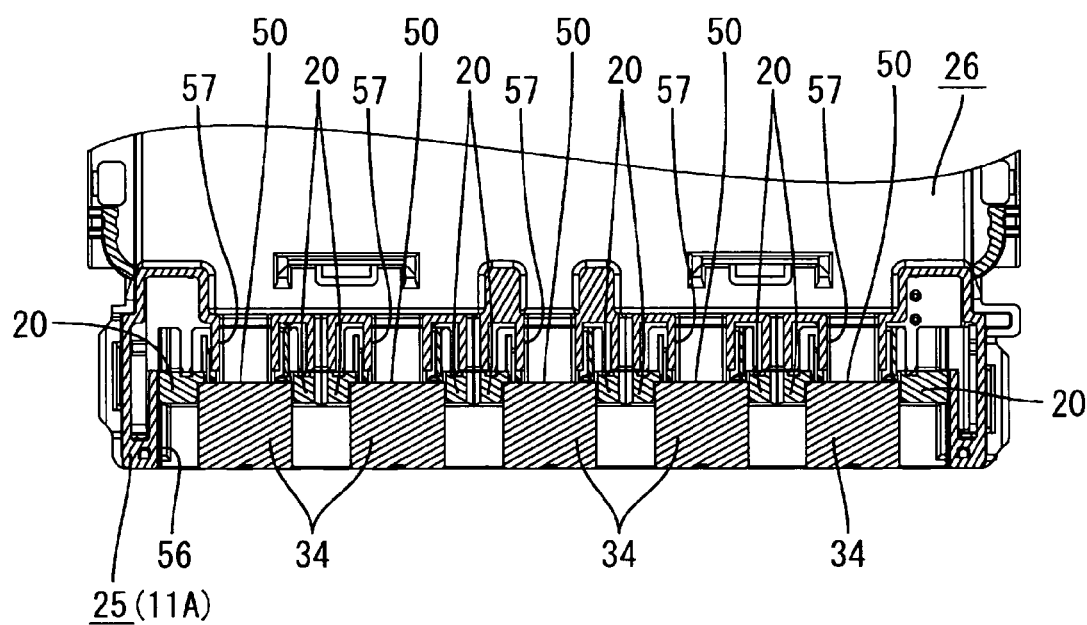
FIG. 9 is a cross-sectional view taken along a line D-D in FIG. 3.

As shown in FIG. 7, the relay 34 forms nearly a rectangular shape. A lead protruding surface 50 having a plurality of lead terminals 40 (five in the present embodiment) protruded is provided in the relay 34. In the present embodiment, as shown in FIG. 9, the relay 34 is attached to the frame 20 in a posture so that the lead protruding surface 50 is facing upward.

The second bus bar 16 is formed by press-molding a metal plate material. As shown in FIG. 7, the second bus bar 16 forms generally an L shape. The second bus bar 16 comprises a bus bar body 51 arranged in nearly parallel with the plate surface of the circuit board 12, and an extension part 52 extending from the end edge in the right front side of the bus bar body 51 toward the obliquely right rear side (the side of the circuit board 12) in FIG. 7. Provided in the upper part of the bus bar body 51 is a relay connecting part 53A (five in the present embodiment), formed by being bent to the left front side so as to be housed within the bus bar housing groove 46 in the above-mentioned mounting member 45. The relay connecting part 53A is welded to the lead terminal 49 in the relay 34 by a known method. On the other hand, a connecting piece 54, which is formed by being bent to the right front side so as to be connected with the above-mentioned first bus bar 15, is provided at the end in the obliquely right rear side in the upper end of the extension part 52 in FIG. 7. As shown in FIGS. 10 and 11, the connecting piece 54 and the first bus bar 15 are connected in a mutually superimposed state by a known method such as welding or soft-soldering.

The first connection fitting 42 is formed by press-molding a metal plate material. As shown in FIG. 7, the first connection fitting 42 forms a nearly rectangular shape. The first connection fitting 42 is welded to the lead terminal 49 in the relay 34 by a known method. At the end in the obliquely right rear side of the first connection fitting 42 in FIG. 7, tabs 55A (three in the present embodiment) to be connected to the circuit board 12 are arranged vertically in a row. The tab 55A is inserted into a through hole (not shown) formed in the circuit board 12, and soldered to the conductive path on the circuit board 12.

As shown in FIG. 7, the second connection fitting 43 is made of a metallic plate material subjected to press-molding or forming, formed into a thin and long plate-like shape of a nearly L. The second connection fitting 43 is provided so as to extend generally from the left front side toward the obliquely right rear side in FIG. 7. A tab 55B is protruding from the right rear end of the second connection fitting 43. The tab 55B is inserted into a through hole (not shown) formed in the circuit board 12, and soldered to the conductive path on the circuit board 12. A relay connecting part 53B formed by being bent upwardly is provided in the left front end of the second connection fitting 43 in FIG. 7. The relay connecting part 53B is welded to the lead terminal 49 in the relay 34 by a known method.

As mentioned, connecting the lead terminal 49 with the second bus bar 16, the first connection fitting 42, and the second connection fitting 43 allows the relay 34 to be provided in the frame 20 in a posture so that the lead protruding surface 50 is facing upward.

As shown in FIG. 11, in a state where the connecting piece 54 in the second bus bar 16 is connected with the first bus bar 15, the extension part 52 of the second bus bar 16 extends in the direction away from the circuit board 12 (to the right side in FIG. 11). Additionally, a relay connecting part 53 is provided at the end of the second bus bar 16 that is on the opposite side of the circuit board 12 (the right end in FIG. 11) by extending in the right direction. As mentioned above, the relay connecting part 53 is connected with the lead terminal 49 in the relay 34.

In addition, as shown in FIG. 10, the first connection fitting 42 and the second connection fitting 43 are extending in the direction away from the circuit board 12 (to the right side in FIG. 10), with the tabs 55A and the 55B respectively provided therein connected with the circuit board 12. Then, as mentioned above, the ends in the first connection fitting 42 and the second connection fitting 43 located on the opposite side of the circuit board 12 are respectively connected with the lead terminal 49 in the relay 34 (see FIG. 6).

The above-mentioned extension part 52, the first connection fitting 42, and the second connection fitting 43 allow the circuit board 12 and the relay 34 to be connected, with a spacing there between.

Figure 12:
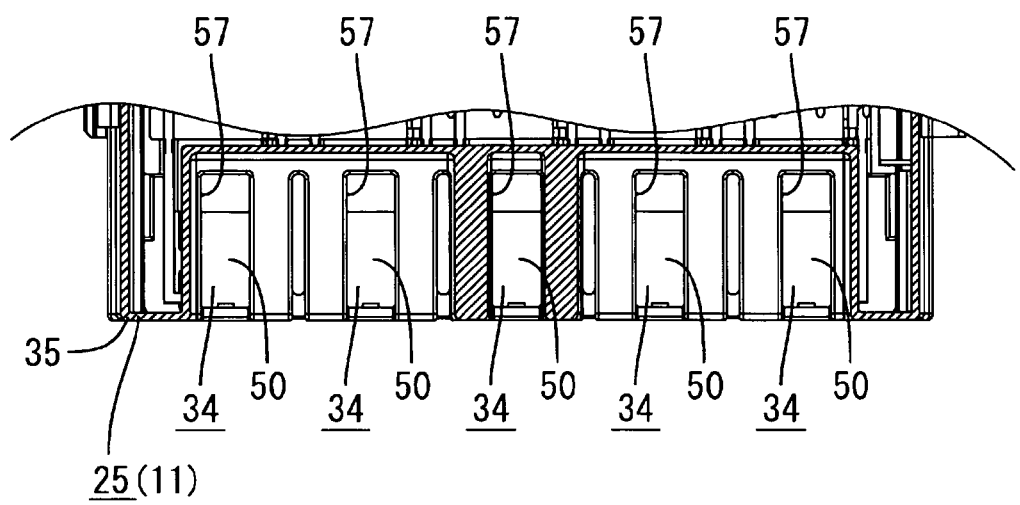
FIG. 12 is a cross-sectional view taken along a line E-E in FIG. 8.

In the cover 25, an opening 56 is formed on the bottom and left side surfaces of the relay housing member 35 in FIG. 4. Additionally, as shown in FIG. 5, an upper wall opening 57 (an example of an opening) is provided on the upper wall of the relay housing member 35 in the cover 25. As shown in FIG. 12, the upper wall openings 57 (five in the present embodiment) are arranged in a row in the right and left direction in FIG. 12.

In the present embodiment, as shown in FIGS. 2, 3, 4, 8, and 12, the opening 56 and the upper wall opening 57 provided in the cover 25 allow all the six walls composing each relay 34 to be exposed to the area outside of the cover 25.

Next, working and effect of the present embodiment is described. In the present embodiment, the circuit board 12 and the relay 34 are connected with a spacing there between, so that the heat generated from the relay 34 when applying power to the same can be suppressed to remain between the relay 34 and the circuit board 12. In addition, all the six walls composing the relay 34 are exposed to the area outside of the cover 25, and thus, the heat generated from the relay 34 is quickly released to the area outside of the cover 25. This suppresses the temperature rise of the circuit board 12 caused by the heat generated from the relay 34, so as the expansion and contraction of the circuit board 12 caused by temperature change. As a result, in the connecting parts between the first bus bar 15 and the circuit board 12, between the first connection fitting 42 and the circuit board 12, and between the second connection fitting 43 and the circuit board 12, generation of cracks in, for example, soldered parts can be suppressed. This can improve the connection reliability between the relay 34 and the circuit board 12.

And also, in the present embodiment, the lead terminal 49 in the relay 34 is welded to the second bus bar 16, the first connection fitting 42, and the second connection fitting 43. This can simplify the connection structure in comparison with the case of connecting the lead terminal 49 with the connection fittings by so-called a tuning fork terminal where, for example, a pair of holding parts are provide in the tips of the second bus bar 16, the first connection fitting 42, and the second connection fitting 43 in the relay 34 side, so as to hold the lead terminal 49 between these holding parts.

In addition, power application to the relay 34 causes heat to be generated from the relay 34. This heat is transmitted to the lead terminal 49. The lead protruding surface 50 having a plurality of protruding lead terminals 49 is formed in the relay 34, and thereby concentrating the heat generated from the relay parts to this lead protruding surface 50. The heat is then transmitted from the lead protruding surface 50 to the air outside of the case 11. Density of the air to which the heat has been transmitted decreases, causing the air to rise and then be released from the lead protruding surface 50. In the present embodiment, the relay 34 is placed in a posture so that the lead protruding surface 50 of the relay 34 is facing upward. This allows the air to which the heat has been transmitted to easily rise up from the lead protruding surface 50, since the lead protruding surface 50 is facing upward. Along with this, new air at a relatively low temperature comes in from the neighbors. As mentioned, while applying power to the relay 34, the lead protruding surface 50 is in contact with air at a relatively low temperature. Consequently, the heat dissipation property of the relay 34 is improved.

<Embodiment 2>

Figure 13:
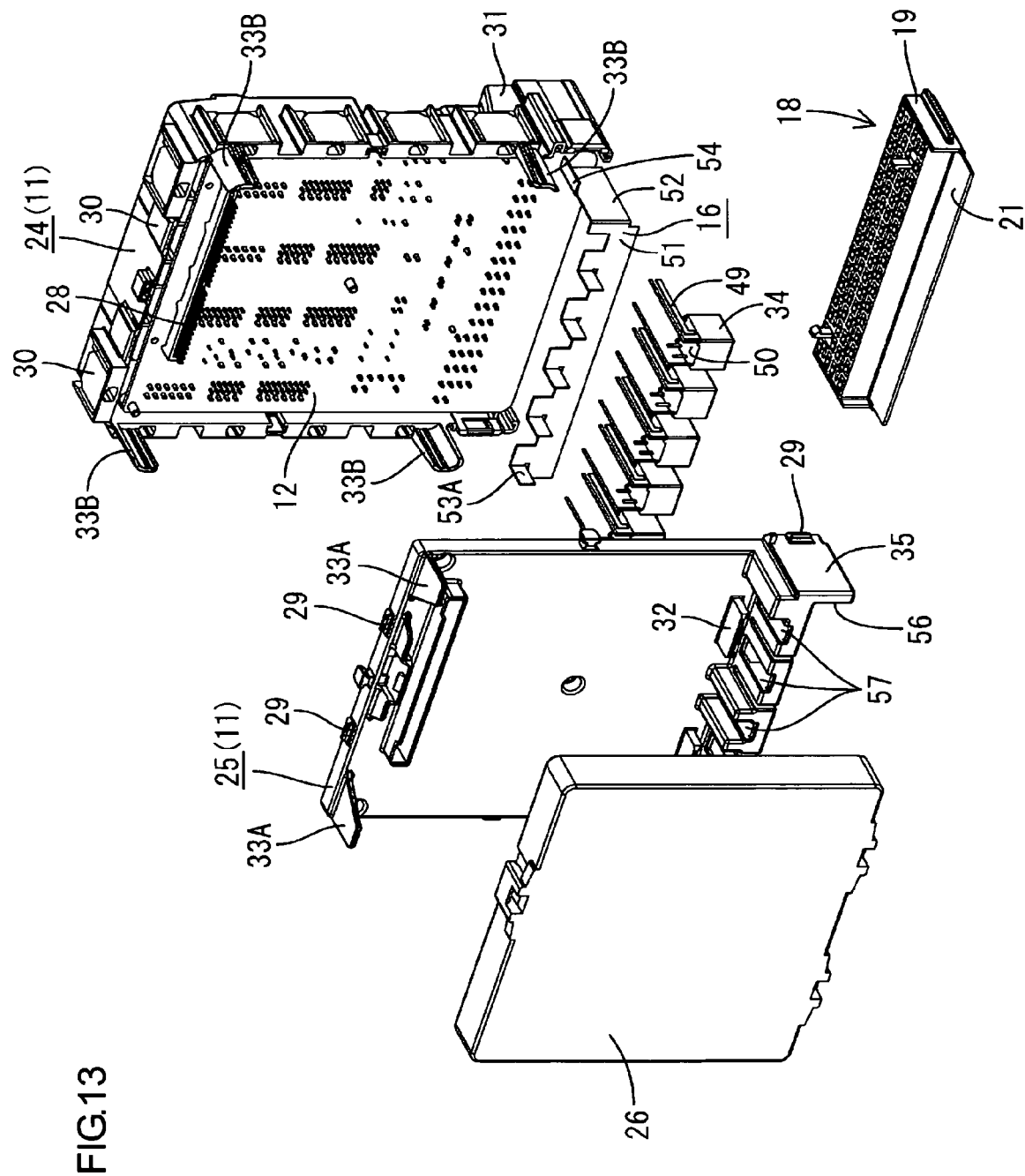
FIG. 13 is an exploded perspective view of the electric connection box according to Embodiment 2.
Figure 14:
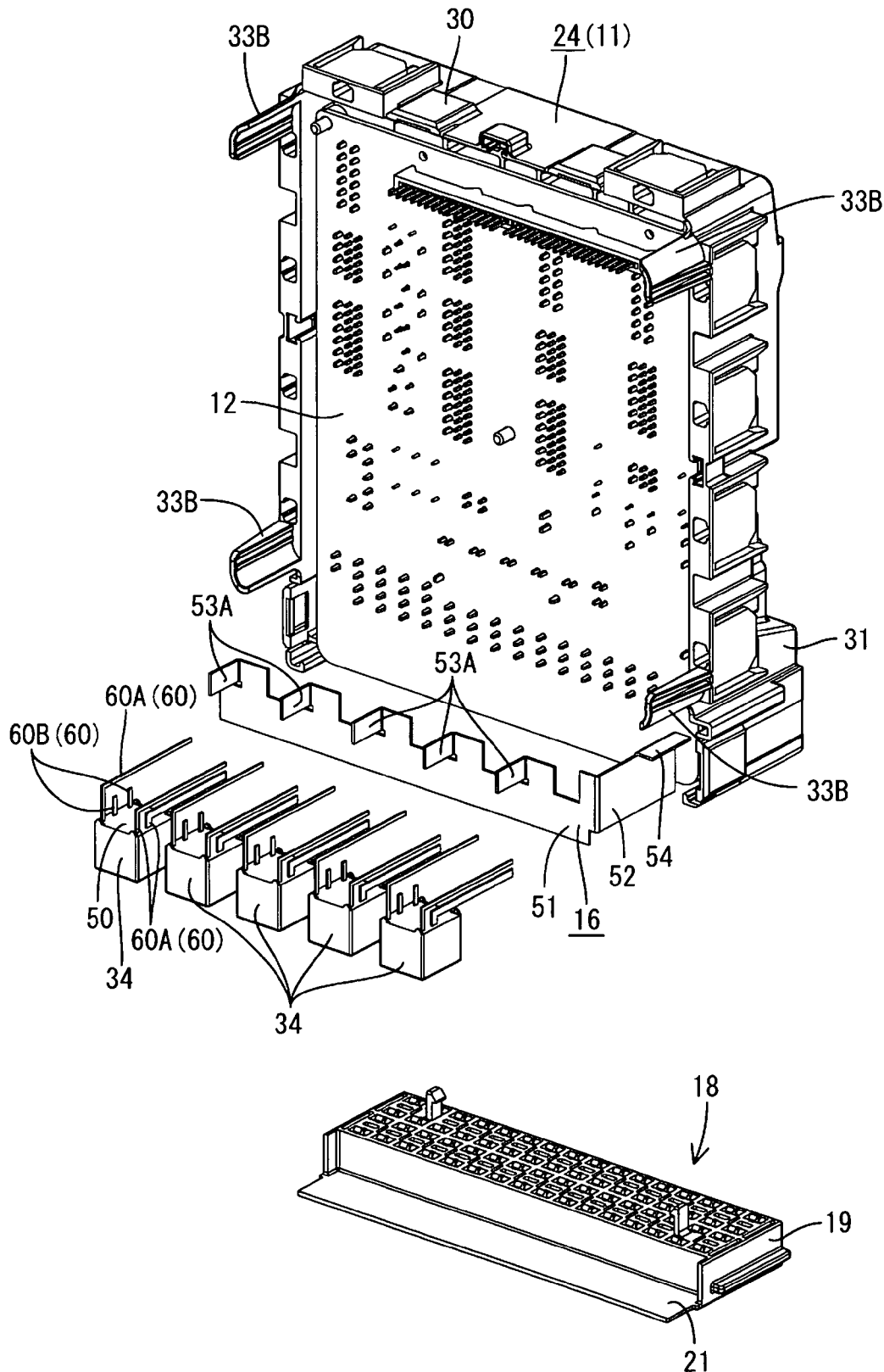
FIG. 14 is an exploded perspective view showing a state of the electric connection box with its cover removed.
Figure 15:
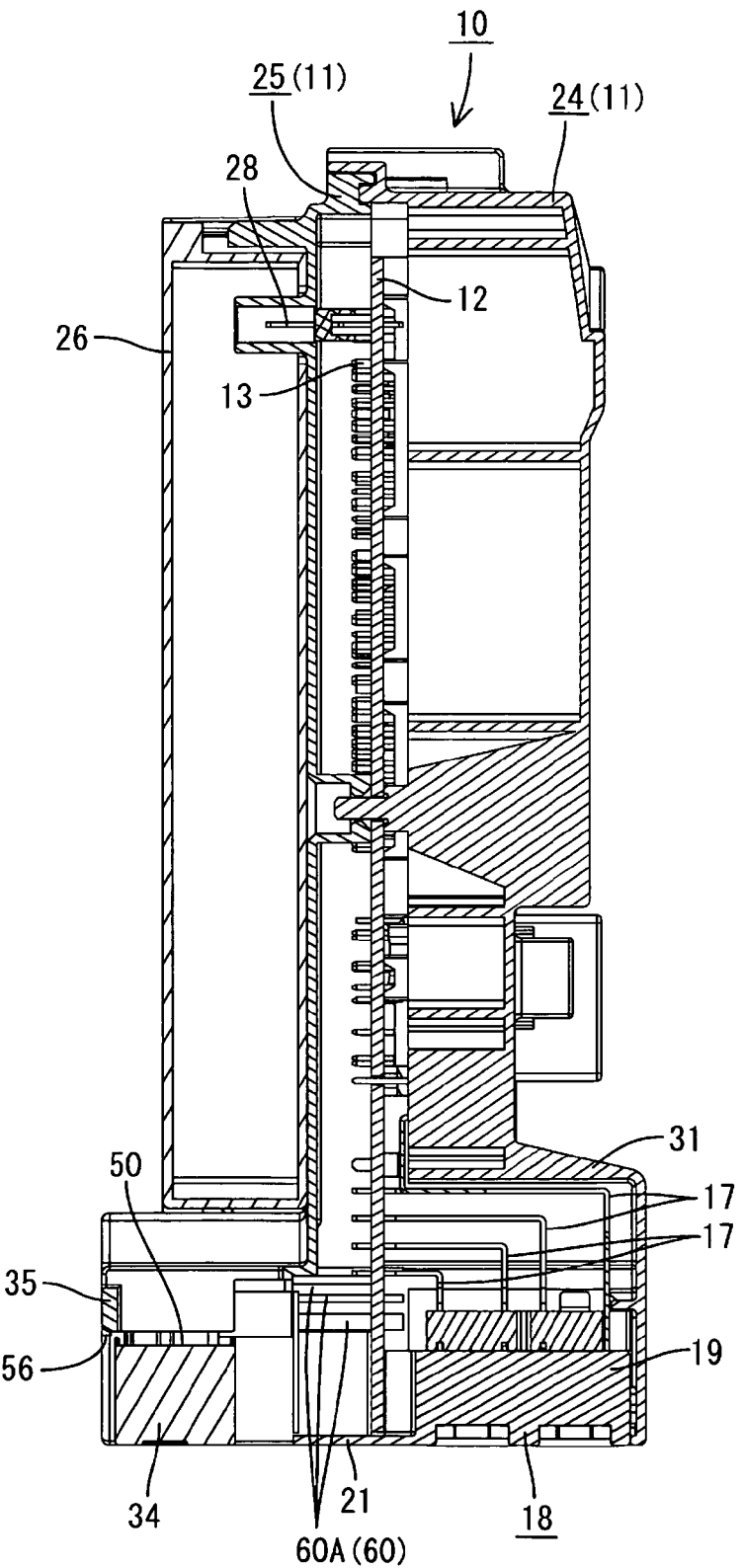
FIG. 15 is a cross-sectional view showing the electric connection box according to Embodiment 2.
Figure 16:
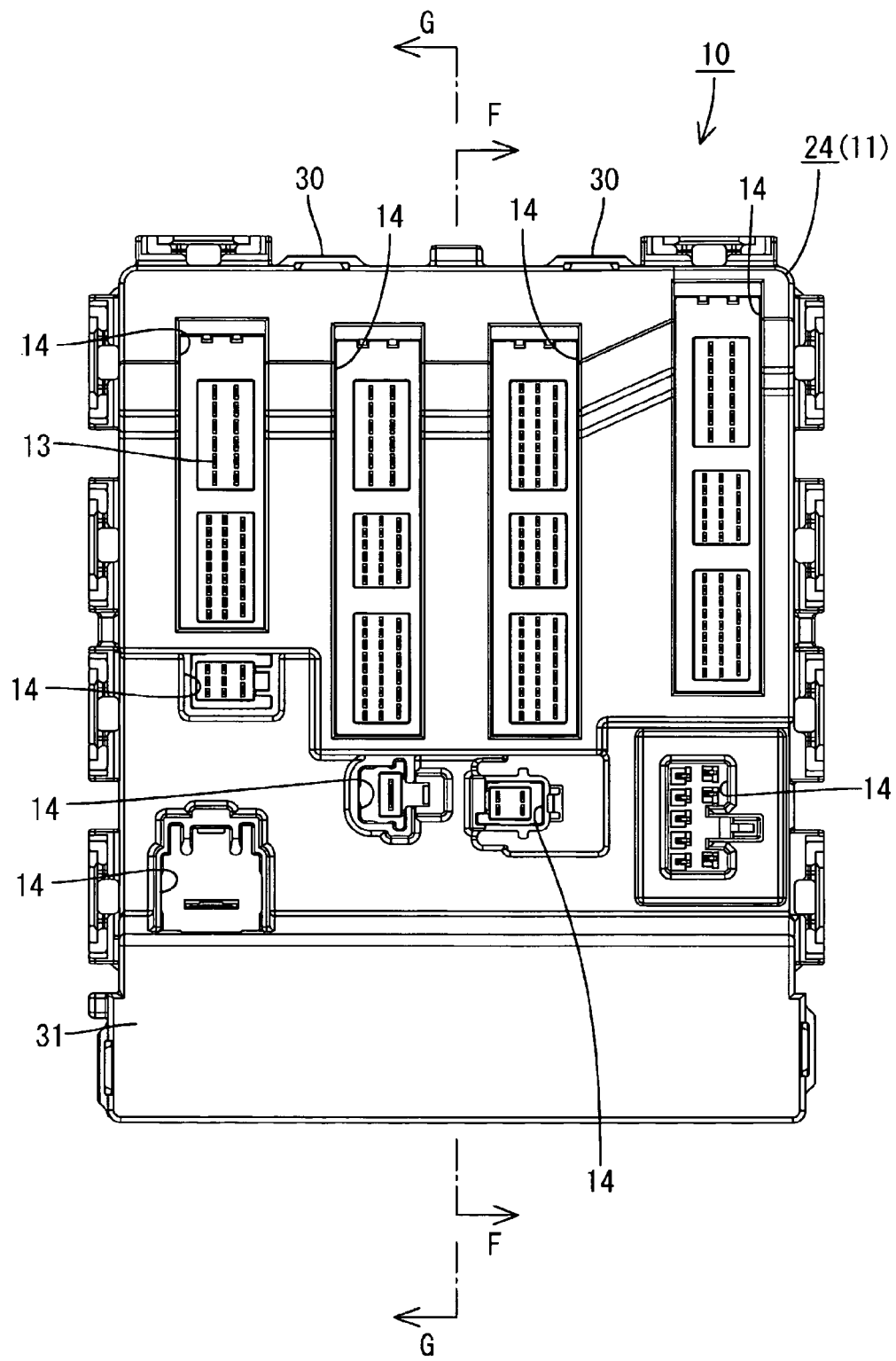
FIG. 16 is an elevation view showing the electric connection box according to Embodiment 3.
Figure 17:
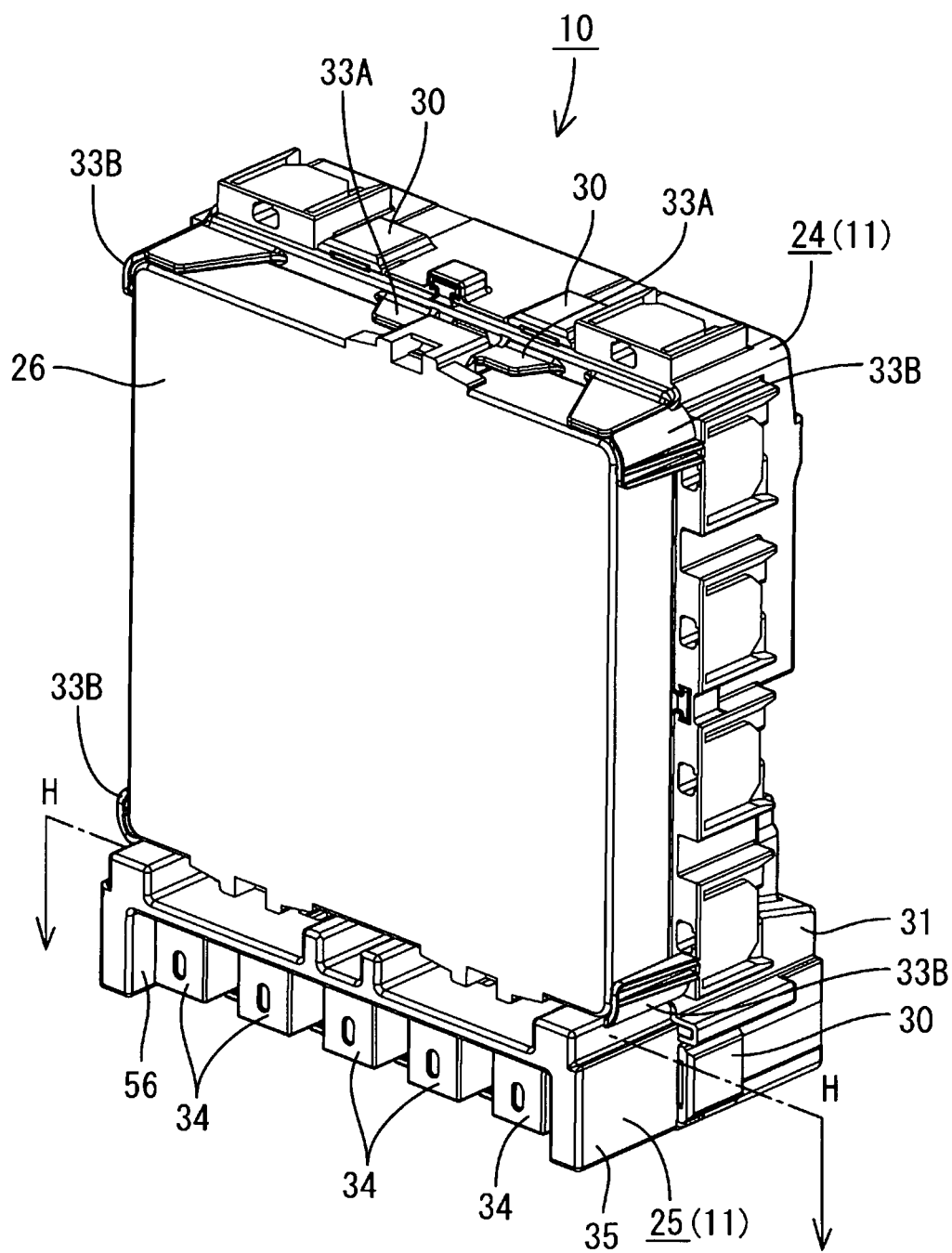
FIG. 17 is a perspective view of the electric connection box.
Figure 18:
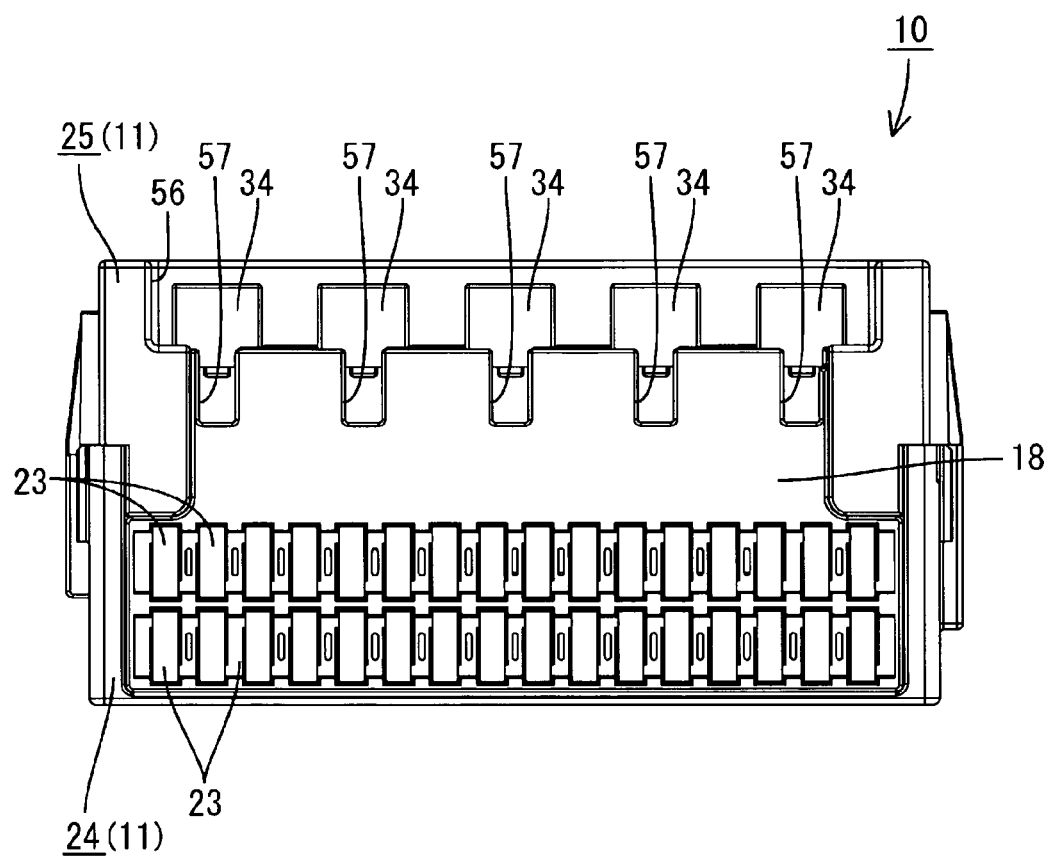
FIG. 18 is a bottom view of the electric connection box.
Figure 19:
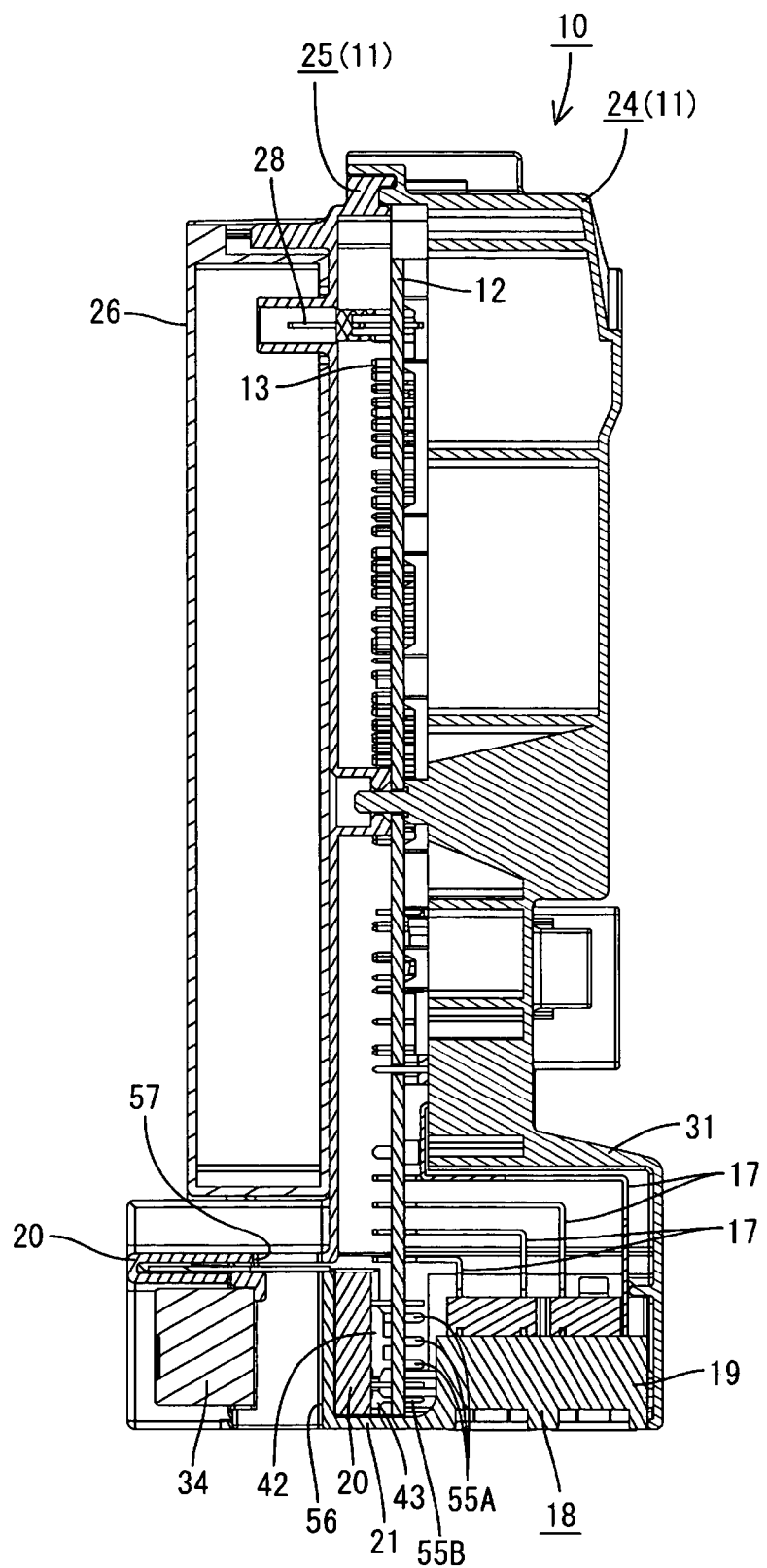
FIG. 19 is a cross-sectional view taken along a line F-F in FIG. 16.
Figure 20:
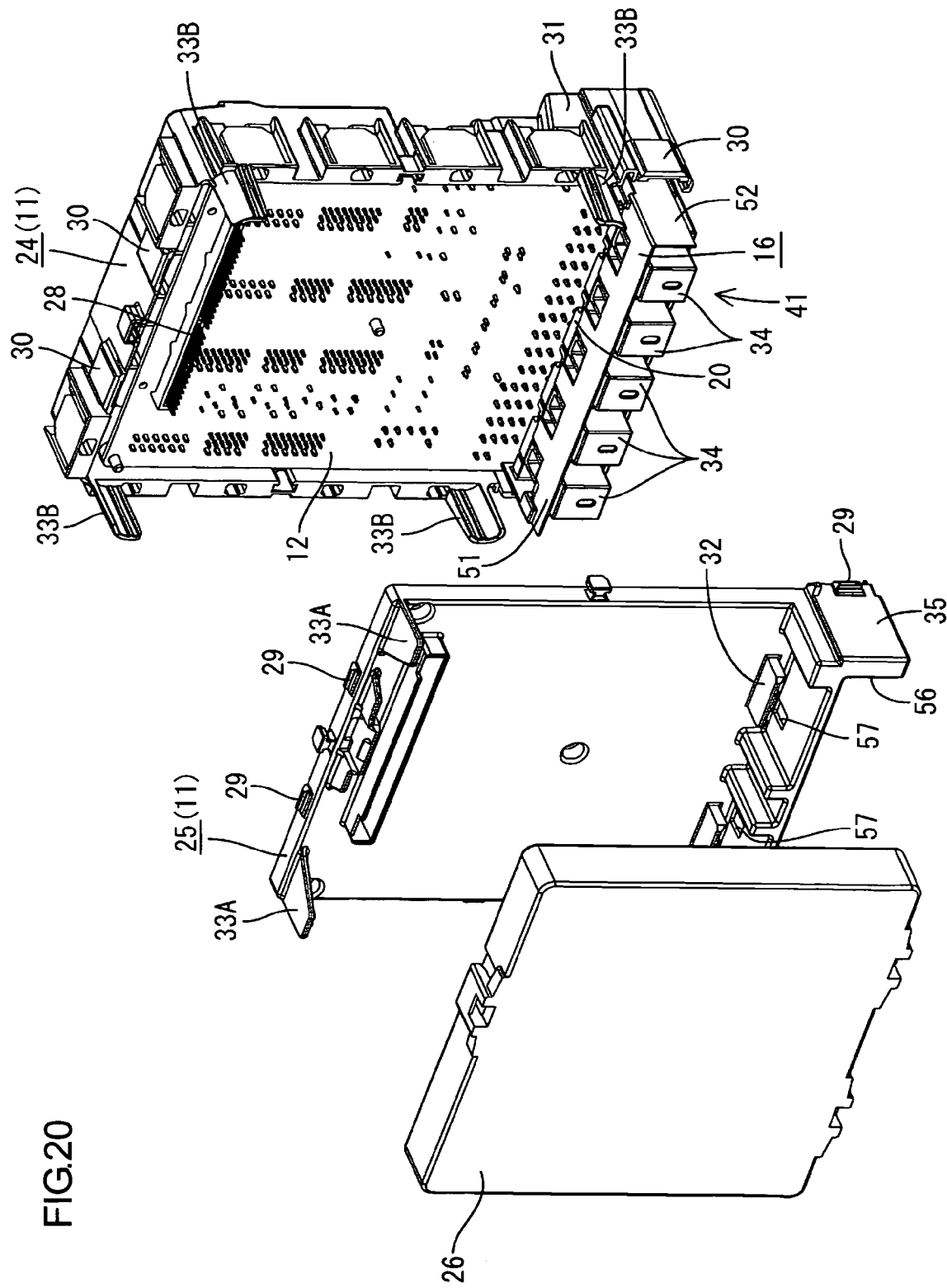
FIG. 20 is an exploded perspective view of the electric connection box.
Figure 21:
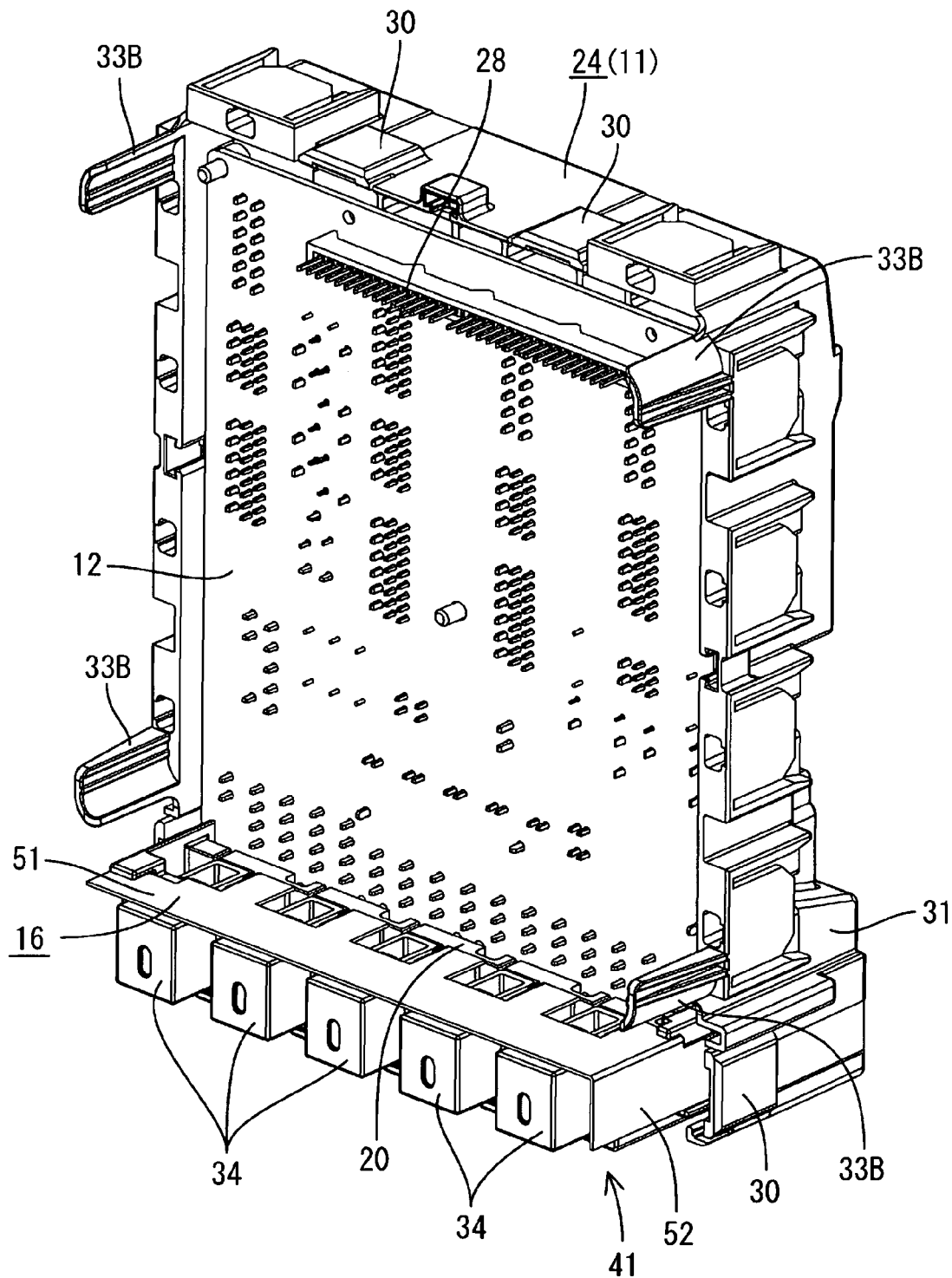
FIG. 21 is a perspective view showing a state of the electric connection box with its cover removed.

Next, in reference to FIGS. 13 to 15, Embodiment 2 of the present invention is described. In the present embodiment, among the lead terminals 60 protruding from the relay 34 protruding surface in the relay 34, the two positioned in the right front side in FIG. 14 and the one positioned in the left rear side are connected to the circuit board 12 while extending in the direction away from the circuit board 12, and thereby forming a conductive member in the present invention. In the present embodiment, the lead terminal 60 in the above is formed by, after protruding upward, extending to the side of the circuit board 12 (in the obliquely right rear direction in FIG. 14).

A lead terminal 60A as a conductive member in the present invention is inserted into a through hole not shown formed in the circuit board 12, and soldered to the conductive path on the circuit board 12.

On the other hand, a lead terminal 60B not as a conductive member in the present invention is welded to the lead connecting part 53 in the second bus bar 16 by a known method. The above lead terminal 60B is not connected to the circuit board 12, and is not therefore a conductive member in the present invention.

As mentioned above, the lead terminal 60A and the circuit board 12 are soldered while the lead terminal 60B and the second bus bar 16 are soldered, so that the relay 34 and the circuit board 12 are connected each other with a spacing there between.

The configurations other than the above are nearly the same as Embodiment 1, and thus, the same numerals are allotted to the same members so as to omit repetitive descriptions thereof.

The present embodiment can simplify the structure, in comparison with the case of consisting the conductive member from the parts other than the lead terminal.

<Embodiment 3>

Figure 22:
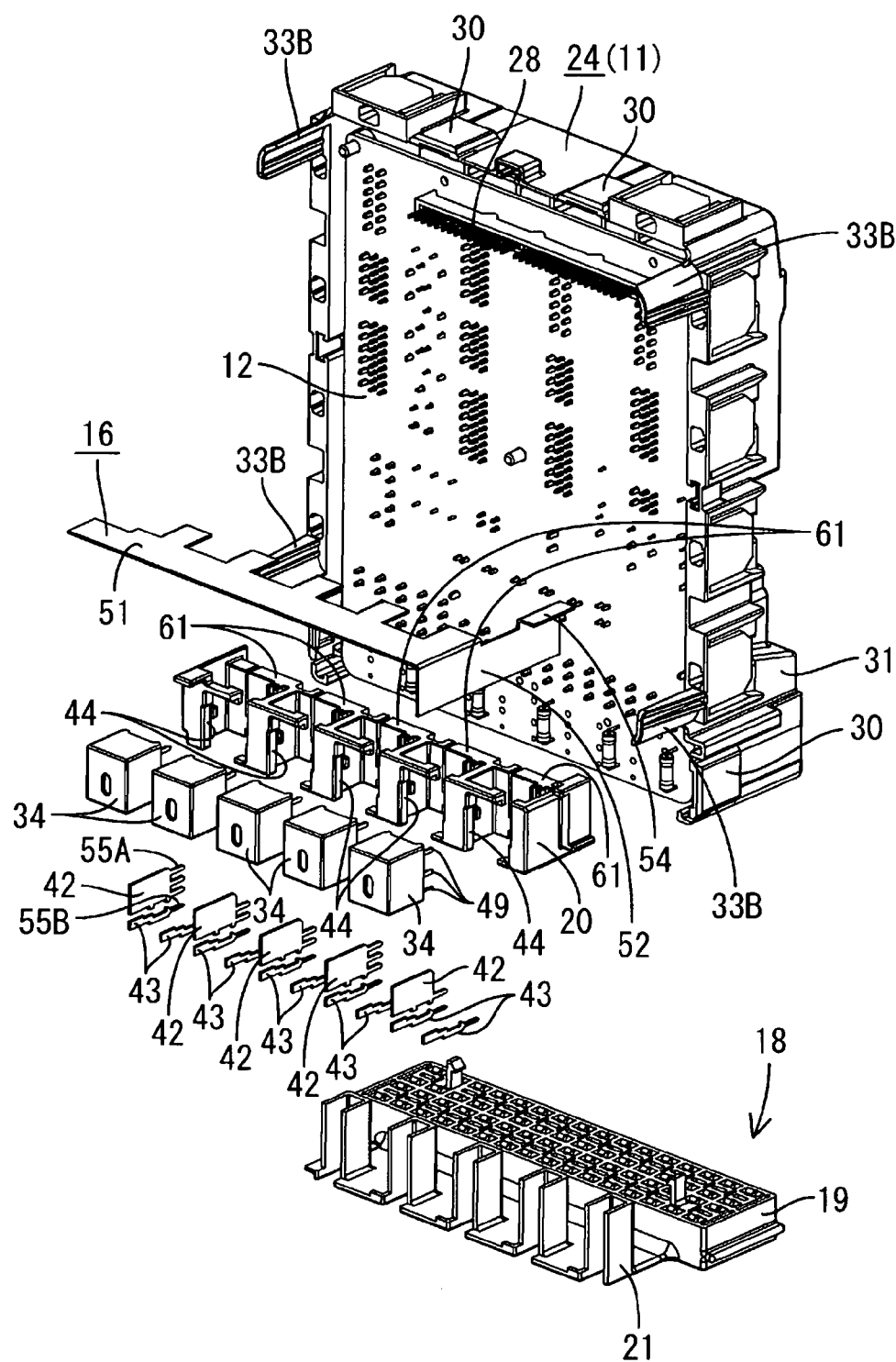
FIG. 22 is an exploded perspective view of the electric connection box in FIG. 21.
Figure 23:
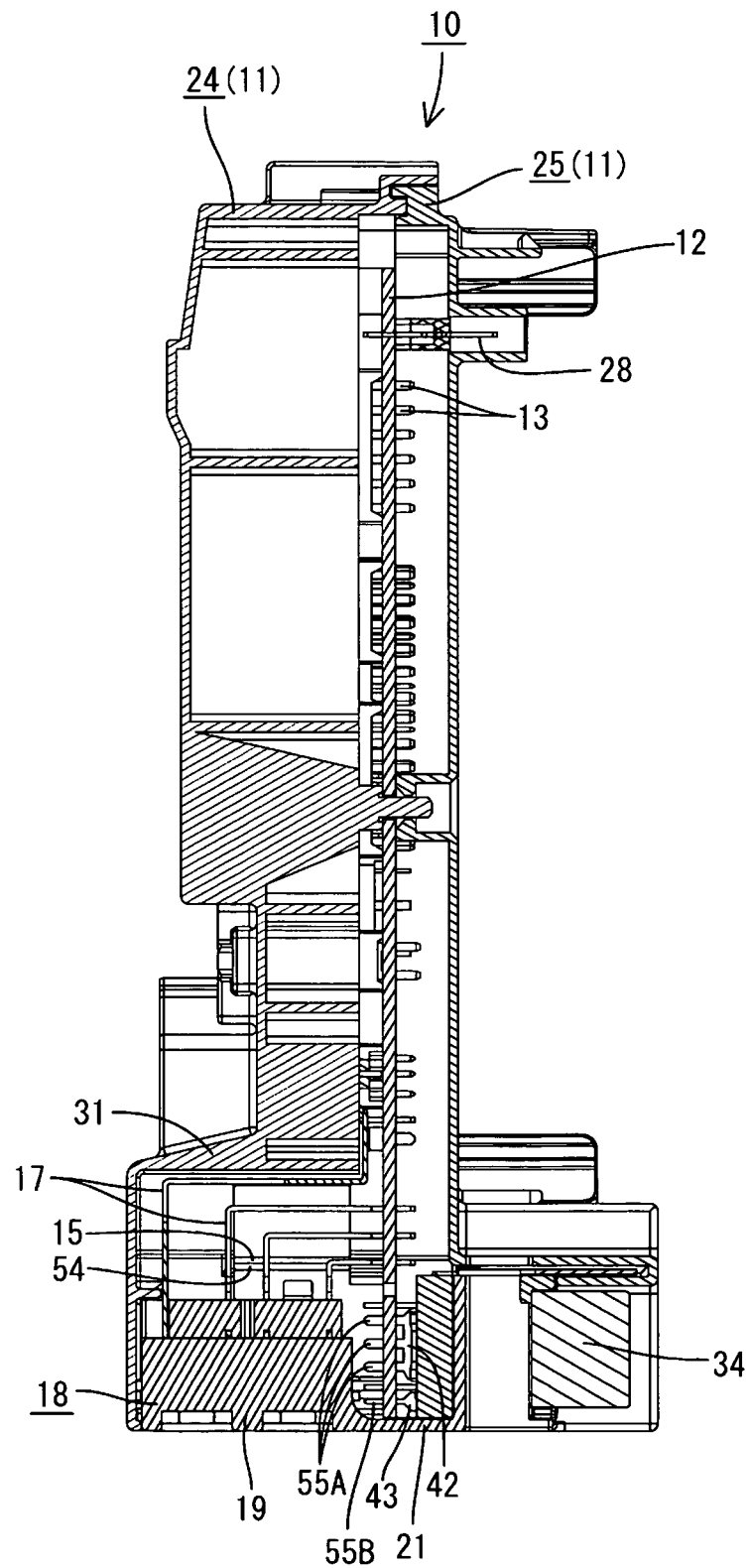
FIG. 23 is a cross-sectional view taken along a line G-G in FIG. 16, showing the electric connection box before an ECU is fitted therein.

Next, in reference to FIGS. 16 to 24, Embodiment 3 of the present invention is described. As shown in FIG. 22, relay fitting members 44 (five in the present embodiment) for fitting the relay 34 are formed in the frame 20, aligning obliquely from the right front side to the left rear side in FIG. 22, while opening to the left front side. In the frame 20, the wall in the obliquely right rear side of each relay fitting member 44 in FIG. 22 is a mounting wall 61 for mounting the second bus bar 16, the first connection fitting 42, and the second connection fitting 43.

Each mounting wall 61 is capable of housing the relay connecting part 53 in the second bus bar 16, the first connection fitting 42, and the second connection fitting 43.

The relay 34 is housed within each relay fitting member 44, with the lead protruding surface 50 faced in the horizontal direction. In the present embodiment, the relay 34 is housed in a manner so as to face to the obliquely right rear direction in FIG. 22, in short, to the side of the circuit board 12.

Figure 24:
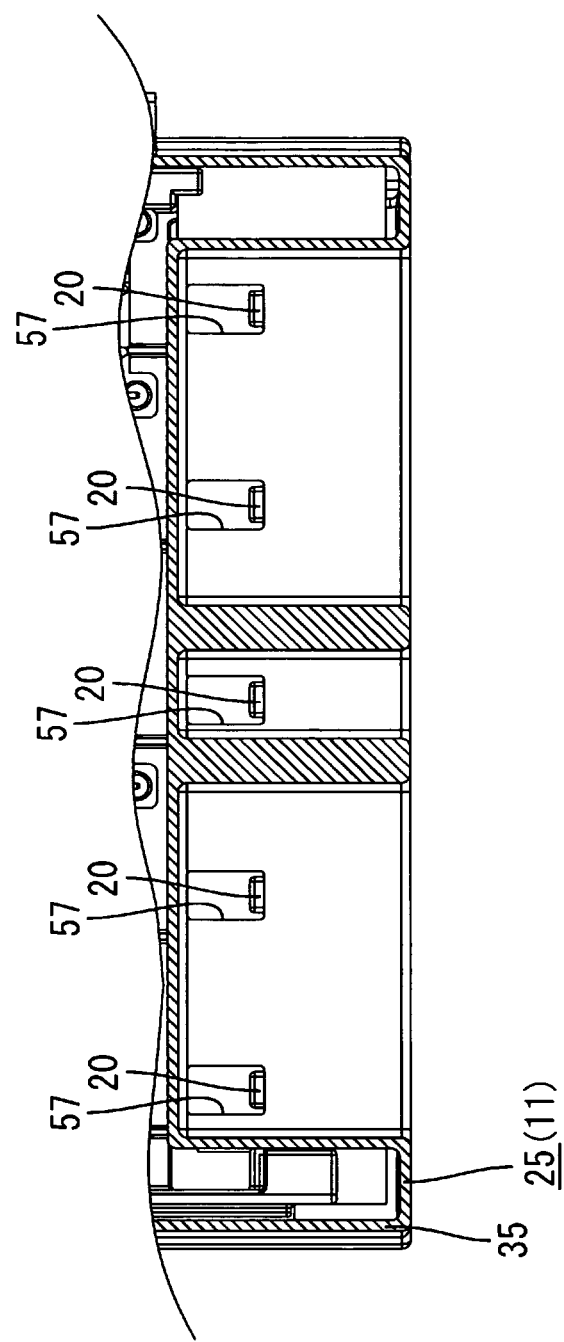
FIG. 24 is a cross-sectional view taken along a line H-H in FIG. 17.

As shown in FIG. 24, the upper wall opening 57 is provided on the upper wall of the relay housing member 35 in the cover 25. As shown in FIG. 24, the upper wall openings 57 (five in the present embodiment) are arranged in a row in the right and left direction in FIG. 24. In the present embodiment, the area the lead protruding surface 50 in the relay 34 is facing and the external area of the cover 25 are interconnected through the upper wall opening 57.

In the present embodiment, as shown in FIGS. 17 to 19 and 23, the opening 56 provided in the cover 25 allows the five walls among the walls constituting each relay 34 other than the upper walls are exposed to the area outside of the cover 25.

The configurations other than the above are nearly the same as Embodiment 1, and thus, the same numerals are allotted to the same members so as to omit repetitive descriptions thereof.

In the present embodiment, the relay 34 is provided in a posture so that the lead protruding surface 50 is facing the side of the circuit board 12 (the horizontal direction). Since the lead protruding surface 50 is facing in the horizontal direction, the air to which the heat has been transmitted can easily rise up from the lead protruding surface 50. Along with this, new air at a relatively low temperature comes in from the neighbors. Consequently, the heat dissipation property of the relay 34 is improved.

<Embodiment 4>

Figure 25:
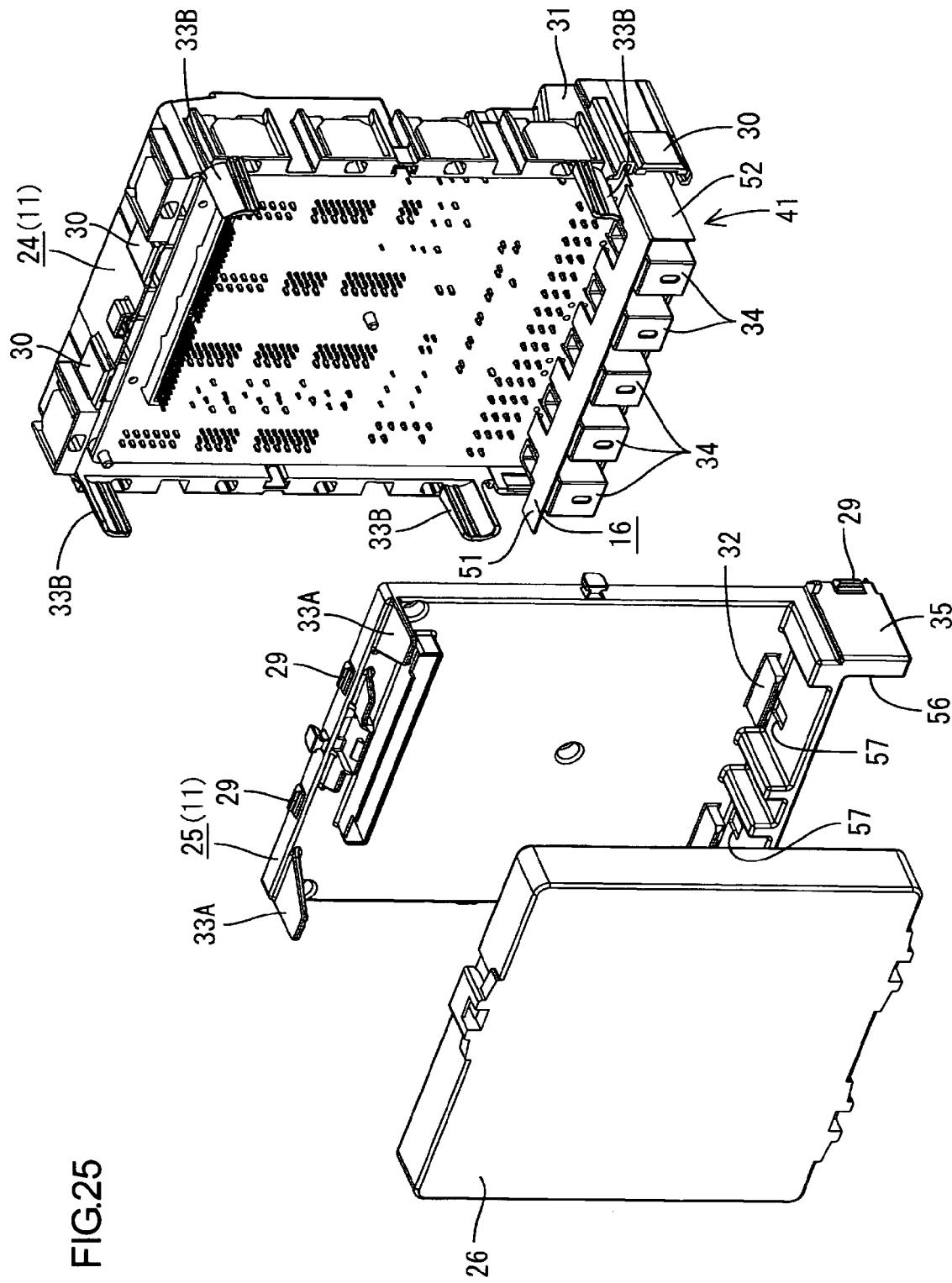
FIG. 25 is an exploded perspective view of the electric connection box according to Embodiment 4.
Figure 26:
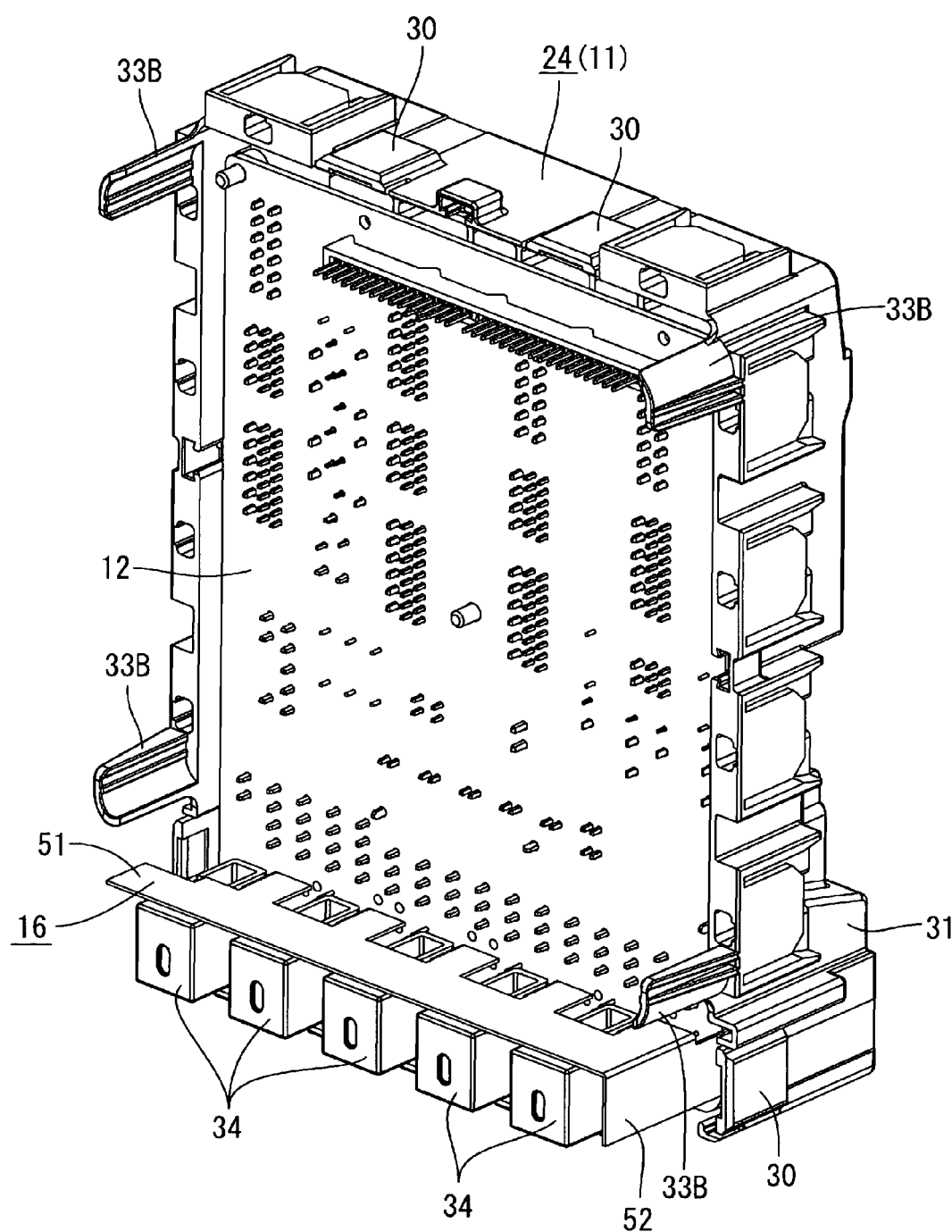
FIG. 26 is a perspective view showing a state of the electric connection box with its cover removed.
Figure 27:
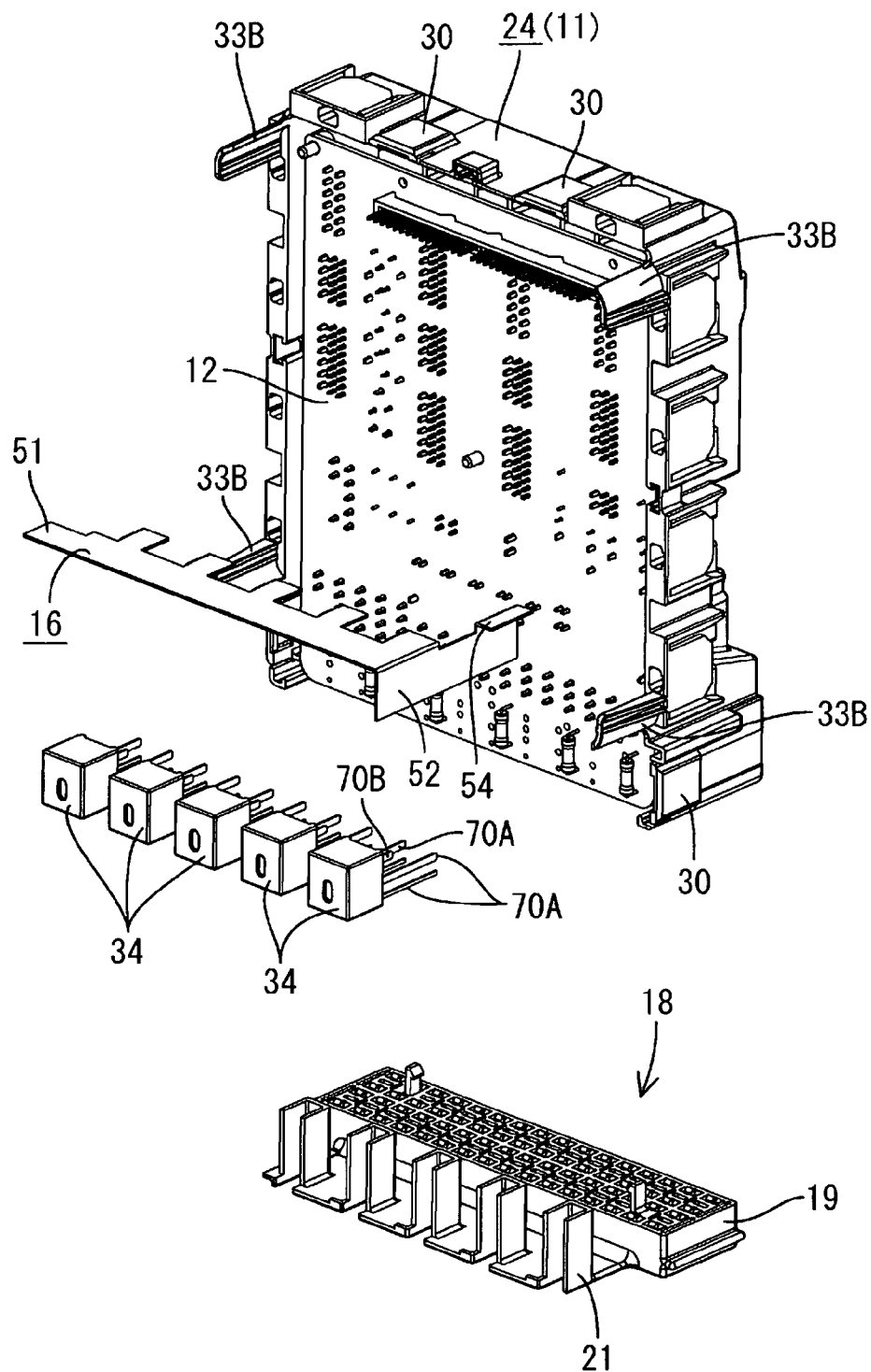
FIG. 27 is an exploded perspective view of the electric connection box in FIG. 26.

Next, in reference to FIGS. 25 to 27, Embodiment 4 of the present invention is described. As shown in FIG. 27, in the present embodiment, some of lead terminals 70 protruding from the relay 34 protruding surface in the relay 34 are formed in a manner of extending to the side of the circuit board 12 (to the obliquely right rear direction in FIG. 27), and thereby forming a conductive member.

A lead terminal 70A as a conductive member is inserted into a through hole not shown formed in the circuit board 12, and soldered to the conductive path on the circuit board 12.

A lead terminal 70B not as a conductive member is welded to the relay connecting part 53 in the second bus bar 16 by a known method.

As mentioned above, the lead terminal 70A as a conductive member and the circuit board 12 are soldered, while the lead terminal 70B not as a conductive member and the second bus bar 16 are soldered, so that the relay 34 and the circuit board 12 are connected each other with a spacing there between.

The configurations other than the above are nearly the same as Embodiment 3, and thus, the same numerals are allotted to the same members so as to omit repetitive descriptions thereof.

The present embodiment can simplify the structure, in comparison with the case of consisting the conductive member from the parts other than the lead terminal.

<Other Embodiments>

With embodiments of the present invention described above with reference to the accompanying drawings, it is to be understood that the invention is not limited to those precise embodiments, and the embodiments as below, for example, can be within the scope of the present invention.

(1) The lead terminals 49, 60A, 60B, 70A and 70B may be connected with the second bus bar 16, the first connection fitting 42, and the second connection fitting 43 by soldering.

(2) The relay 34 may be provided in a posture so that the lead protruding surface 50 is facing, for example, downward in FIG. 6. In addition, the lead 34 may be provided in a posture so that the lead protruding surface 50 is facing, for example, in the direction away from the circuit board 12 in FIG. 21.

(3) In the present embodiment, the lead protruding surface 50 having a plurality of protruding lead terminals 49 is formed in the relay 34, however, the present invention is not limited to this, and a plurality of the lead terminals 49 may be protruded from different surfaces in a plurality of the relays 34.

(4) As a switching member, a semiconductor device may be used.

The invention claimed is:

1. An electric connection box, comprising:
a circuit board,
a conductive member which is connected with the circuit board and is extending in the direction away from the circuit board,
a plurality of switching members provided at the end of the conductive member which is located on the opposite side of the circuit board, and
a case for housing the circuit board, the case including a frame that is provided with a plurality of openings, wherein
each opening is located in a position corresponding to each of the switching members, respectively,
each of the switching members is a relay that is provided with a lead protruding surface, and
all six walls composing each of the switching members, including the lead protruding surface, are exposed to an area outside of the case.

2. The electric connection box according to claim 1, wherein the lead protruding surface includes a plurality of lead terminals protruding outward, and the relay is provided in a posture so that the lead protruding surface is facing in a vertical direction to gravity.

3. The electric connection box according to claim 2, wherein the relay is provided in a posture so that the lead protruding surface is facing upward.

4. The electric connection box according to claim 3, wherein the conductive member is a connection fitting that is welded or soldered to a lead terminal in the switching member.

5. The electric connection box according to claim 3, wherein the conductive member is constituted by extending a lead terminal in the switching member to the side of the circuit board.

6. The electric connection box according to claim 1, wherein the lead protruding surface includes a plurality of lead terminals protruding outward, and the relay is provided in a posture so that the lead protruding surface is facing in a horizontal direction.

7. The electric connection box according to claim 6, wherein the conductive member is a connection fitting that is welded or soldered to a lead terminal in the switching member.

8. The electric connection box according to claim 6, wherein the conductive member is constituted by extending a lead terminal in the switching member to the side of the circuit board.

9. The electric connection box according to claim 1, wherein the conductive member is a connection fitting that is welded or soldered to a lead terminal in the switching member.

10. The electric connection box according to claim 1, wherein the conductive member is constituted by extending a lead terminal in the switching member to the side of the circuit board.

* * * * *